(12) United States Patent
Tampieri

(10) Patent No.: US 6,496,597 B1
(45) Date of Patent: Dec. 17, 2002

(54) GENERATING IMAGE DATA

(75) Inventor: Filippo Tampieri, Montreal (CA)

(73) Assignee: Autodesk Canada Inc., Montreal (CA)

( * ) Notice: Subject to any disclaimer, the term of this patent is extended or adjusted under 35 U.S.C. 154(b) by 0 days.

(21) Appl. No.: 09/261,142

(22) Filed: Mar. 3, 1999

(51) Int. Cl.$^7$ ................................................ G06K 9/00
(52) U.S. Cl. ...................... 382/154; 382/174; 382/206; 382/285; 345/419; 345/422; 345/426; 345/653; 356/405
(58) Field of Search ................................ 382/154, 174, 382/206, 226, 282, 285; 365/419, 422, 426, 427, 428, 585, 589, 640, 653, 654; 356/405

(56) References Cited

U.S. PATENT DOCUMENTS

| | | | |
|---|---|---|---|
| 4,873,651 A | * 10/1989 | Raviv | 250/224 |
| 4,928,250 A | * 5/1990 | Greenberg et al. | 345/587 |
| 5,175,808 A | 12/1992 | Sayre | 382/293 |
| 5,222,205 A | * 6/1993 | Larson et al. | 345/587 |
| 5,313,568 A | * 5/1994 | Wallace et al. | 345/426 |
| 5,488,700 A | 1/1996 | Glassner | 345/426 |
| 5,579,455 A | 11/1996 | Greene et al. | 345/419 |
| 5,734,385 A | 3/1998 | Mima | 345/502 |
| 5,808,620 A | 9/1998 | Doi et al. | 345/426 |
| 5,894,309 A | 4/1999 | Freeman et al. | 345/426 |
| 5,909,087 A | 6/1999 | Bryde et al. | 315/149 |
| 5,914,721 A | 6/1999 | Lim | 345/421 |
| 5,917,937 A | * 6/1999 | Szeliski et al. | 382/154 |
| 5,936,633 A | 8/1999 | Aono et al. | 345/589 |
| 6,028,608 A | * 2/2000 | Jenkins | 345/619 |
| 6,078,332 A | 7/2000 | Ohazama | 345/426 |
| 6,084,590 A | 7/2000 | Robotham et al. | 345/419 |
| 6,111,582 A1 | * 8/2001 | Jenkins | 345/427 |

OTHER PUBLICATIONS

J. Dorsey et al., "Interactive Design of Complex Time–Dependent Lighting," IEEE Comp. Graphics and Applications, 15(2):26–35, 1995.

J. Nimeroff, "Implementation and Analysis of an Image–Based . . . Environments," IEEE Trans. on Visalization and Comp. Graphics, 2(4):283–297, 1996.

D. Lischinski et al., "Discontinuity Meshing for Accurate Radiosity," Cornell Univ., IEEE Comp. Graphics and Applications, pp. 25–39, 1992.

D.W. George et al., "Radiosity Redistribution for Dynamic Environments," Cornell Univ., IEEE Comp. Graphics and Applications, pp. 26–34, 1990.

Y. Chrysanthou, "Fast Approximate Quantitative Visibility for Complex Scenes," IEEE Comp. Graphics Int'l Proceedings, pp. 220–227, 1998.

E. Pang et al., "An Efficient Implementation of Affine Transformation Using One–Dimensional FFT's," University of Toronto, Ontario, Canada MTS 3G4, IEEE Conf., 4:2885–2888, 1997.

* cited by examiner

*Primary Examiner*—Leo Boudreau
*Assistant Examiner*—Sheela Chawan
(74) *Attorney, Agent, or Firm*—Gates & Cooper LLP

(57) ABSTRACT

Image data is generated by a process of radiosity, wherein a plurality of elements are defined in three dimensional space. Selected elements are set as being non-occluding and light emission values for said elements are determined by calculating the effect of light reflections between the elements. An accumulated total level of light is adjusted in response to the visibility of elements including at least one of said non-occluding elements.

12 Claims, 19 Drawing Sheets

Figure 5B $\quad B_i A_i = E_i A_i + R_i \sum_{j=1}^{n} B_j A_j \cdot F_{ji}$

Figure 5C $\quad F_{ij} \cdot A_i = F_{ji} \cdot A_j$

Figure 5D $\quad B_i = E_i + R_i \sum_{j=1}^{n} B_j F_{ij}$ $$\sum_{i=1}^{n} F_{ji} = 1$$

$$B_j = E_j + R_j \cdot \frac{\sum_{i=1}^{n} B_i \cdot F_{ji}}{\sum_{i=1}^{n} F_{ji}}$$

GENERATING IMAGE DATA

FIELD OF THE INVENTION

The present invention relates to generating image data, wherein a plurality of elements are defined in three dimensional space.

BACKGROUND OF THE INVENTION

Several procedures are known for rendering images containing elements defined as three dimensional data. A known approach to generating images of photo-realistic quality is to consider reflections between all elements simultaneously. The light emission of any given element is considered as being dependent upon the sum of contributions from all other elements, and a set of equations is defined that represents these interactions. The light emission values for all the elements are then determined simultaneously by solving the system of equations.

This procedure is known as radiosity simulation. The system of equations is usually extremely large and several refinements to radiosity simulation have been established in order to make implementation of this method practical for scenes containing large numbers of elements.

A known advantage of radiosity is that once the system of equations has been solved and light emission values have been determined, the light emission of elements may be considered as view-independent, resulting in a separate radiosity rendering process which is capable of rendering a view from any position. The high efficiency of radiosity rendering makes radiosity particularly suitable for demanding applications, such as generating long sequences of image data frames for film or video, or generating image data in real time.

In the process of radiosity simulation, the presence of occluding elements may significantly increase the level of computation required to define a system of equations. Establishing a system of equations requires an evaluation is to be made of the amount of light transferred between every possible pair of elements. If an additional element interferes with the transfer of light between a pair of elements, it is said that the receiving element is occluded. Under these circumstances, evaluation of the proportion of light received by the receiving element becomes much more complex than when it can be assumed that there is no occluding element present.

Thus the presence of occlusions can significantly increase the required level of processing in the radiosity simulation procedure, and in many situations considering certain elements as being occluding may result in minimal enhancement to the realism of the synthesized image. Consequently, it is known to selectively ignore some occlusions and then perform a radiosity simulation in which it is assumed that the same quantum of light may reflect off both the occluding and occluded elements. This procedure can reduce the level of computational overhead required during a radiosity simulation. However, as is known, this may also introduce unwanted visual artifacts.

SUMMARY OF THE INVENTION

According to a first aspect of the present invention, there is provided a method of generating image data, wherein a plurality of elements are defined in three dimensional space; wherein selected elements are set as being non-occluding; light emission values for said elements are determined by calculating the effect of light reflections between said elements; and an accumulated level of light is adjusted in response to the visibility of elements including at least one of said non-occluding elements.

In a preferred embodiment, the level of light is reduced to be substantially similar to that achieved when said non-occluding elements are occluding.

According to a second aspect of the present invention, there is provided a method of generating image data, wherein a plurality of elements are defined in three dimensional space; wherein selected elements are set as being non-occluding; light emission values for said elements are determined by calculating the effect of light reflections between said elements; and light emission errors resulting from said non-occluding elements are combined with light emission values resulting from other elements.

According to a third aspect of the present invention, there is provided a method of generating image data, wherein a plurality of elements are defined in three dimensional space; wherein selected elements are set as being non-occluding; light emission values for said elements are determined by calculating the effect of light reflections between said elements; and light emission errors resulting from said non-occluding elements are reduced by the steps of: accumulating a brightness value for an element; accumulating a form factor for an element; and normalising said accumulated brightness value in response to said accumulated form factor.

BRIEF DESCRIPTION OF THE DRAWINGS

FIG. 5B summarises light energy transfer between a single receiving surface, and an arbitrary number of emitting surfaces;

FIG. 5C shows the radiosity reciprocity equation;

FIG. 5D shows the classical radiosity equation;

DETAILED DESCRIPTION OF THE PREFERRED EMBODIMENTS

Figure 1:
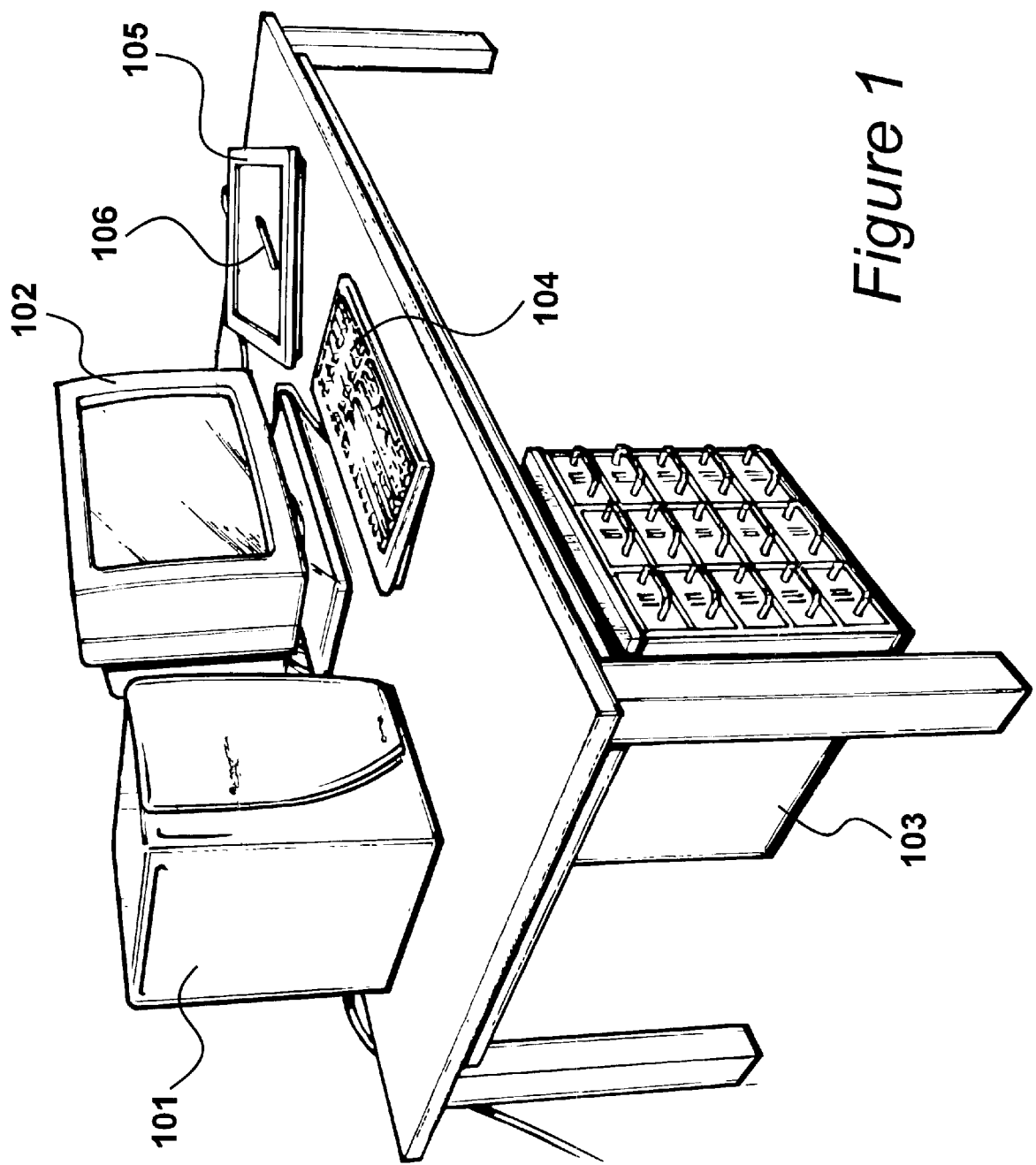
FIG. 1 shows a system for generating image data, including a monitor and a processing system.

A system for generating image data using radiosity is illustrated in FIG. 1. The radiosity process involves performing a radiosity simulation in which light emission values are calculated for all elements in the scene, irrespective of viewing position. Thereafter, this information is made available for particular viewing positions during radiosity rendering. The rendering process requires a sufficiently low level of computation to enable image frames of high definition and high photo realism to be rendered with high efficiency, reducing off-line processing time and also facilitating the generation of live image data, for example at video rate.

A processing system 101, such as an Octane™ produced by Silicon Graphics Inc., supplies output image signals to a video display unit 102. A user defines a scene in terms of objects in three dimensions, or by importing three-dimensional scene data from a pre-existing scene structure. The user may also determine a stationary or moving camera position from which to view the resulting rendered scene image. Rendered frames of image data, derived from three-dimensional scene data, are stored by means of a striped redundant array of inexpensive discs (RAID) 103. The system receives user commands from a keyboard 104 and a graphics tablet 105 operated by a pressure sensitive stylus 106.

Figure 2:
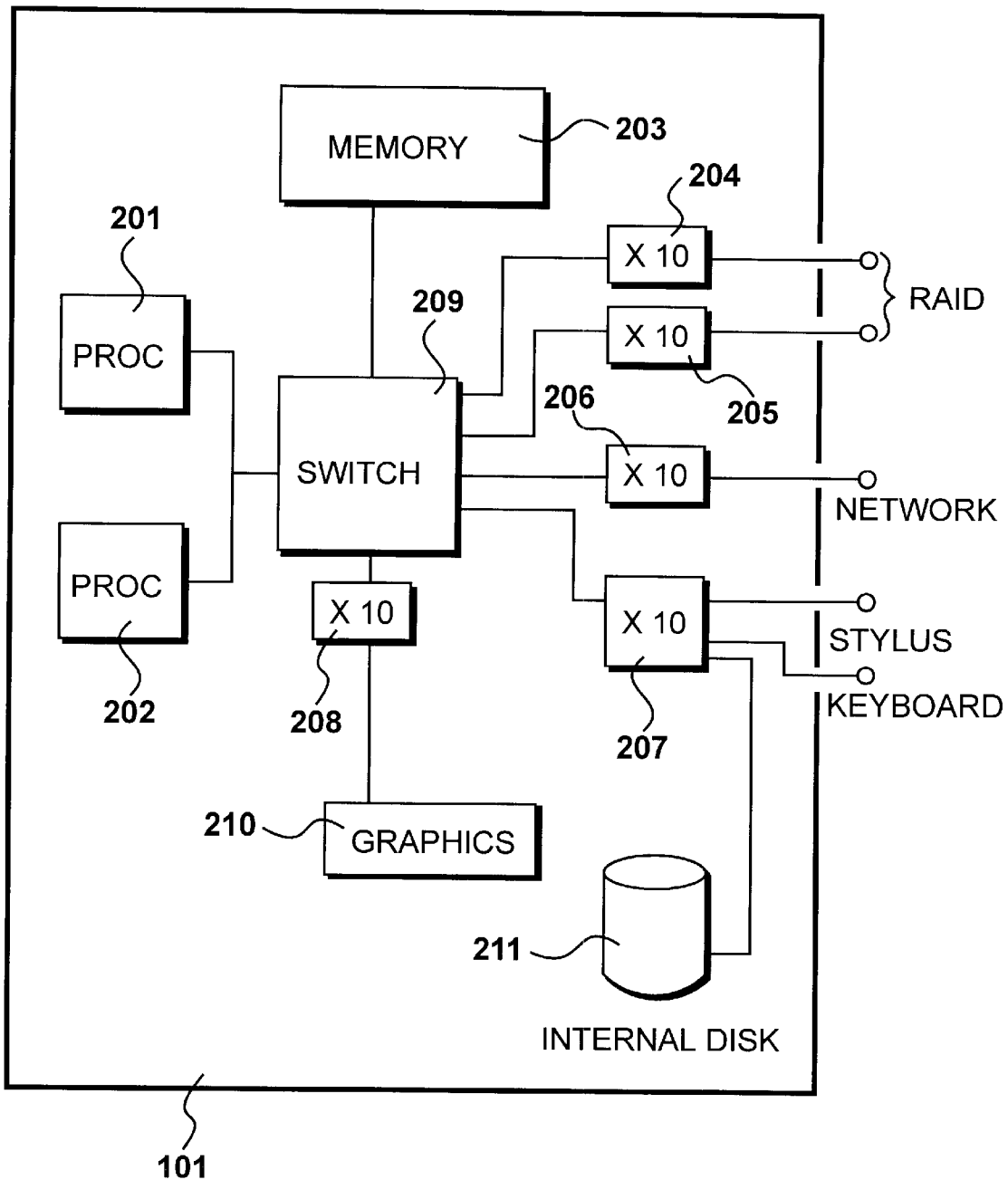
FIG. 2 details the processing system shown in FIG. 1.

The processing system 101 is detailed in FIG. 2. The processing system comprises two central processing units 201 and 202 operating in parallel. Each of these processors is a MIPS R10000 manufactured by MIPS Technologies Incorporated, of Mountain View, Calif. A non-blocking cross-bar switch 209 permits non-blocking full bandwidth communication between the two processors 201 and 202 and with a memory 203 and other peripherals. The memory 203 includes typically two hundred and fifty-six megabytes of dynamic RAM. The memory is used to store instructions for the processors and data including a large quantity of element data that is required while performing the process of radiosity simulation. Input and output interface circuits are denoted as XIO in the diagram shown in FIG. 2. External connections, and connections to slow peripherals such as serial ports are made via XIO interface circuits, in order to provide synchronization between the peripheral circuits and the extremely high speed data paths of the main processor structure.

A first XIO interface circuit 204 provides bidirectional connections to the RAID array 103 shown in FIG. 1. A second XIO interface circuit 205 provides additional connectivity to an additional RAID array, should it become necessary to increase storage requirements for image data. A third XIO interface circuit 206 provides a data connection to a network, over which three-dimensional scene data may be shared. A further XIO interface circuit 207 facilitates connection with the stylus 105 and the keyboard 104 shown in FIG. 1, in addition to an internal hard disk drive 211, typically four gigabytes in size, upon which instructions for the processors 201 and 202 are stored. An additional XIO interface circuit provides a connection between the cross-bar switch 209 and a graphics processor 210. The graphics processor 210 receives instructions from processors 201 and 202 in such a way as to construct a two dimensional image field for display on the video monitor 102.

Figure 3:
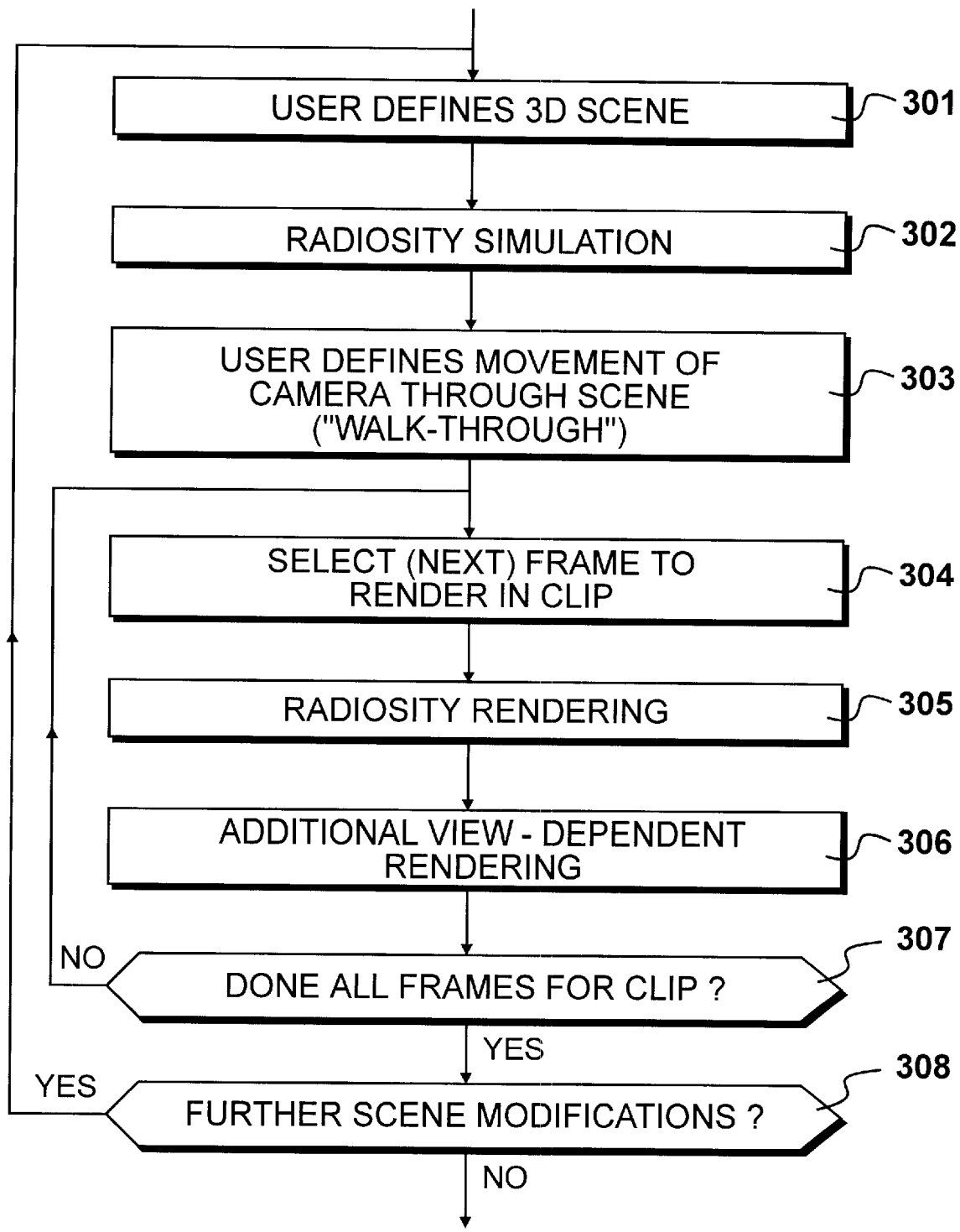
FIG. 3 details processes performed by the processing system shown in FIG. 2 when generating image data, including a process of radiosity simulation.

Procedures performed by processors 201 and 202 are illustrated in FIG. 3. At step 301 a user defines a three dimensional scene, which may involve importing three dimensional information from an external source, for example over the network connection. At step 302 a radiosity simulation is performed, configured to analyze objects within the scene so as to optimize their deconstruction into mesh elements, and then to calculate a light emission value for each mesh element.

At step 303 the user defines movement of a virtual camera through the scene, defining a changing view that is known as a "walk through". The same element light emission values generated by the radiosity simulation procedure 302 may be used for any desired camera view, provided that the relative positioning of objects within the scene does not change.

At step 304 a frame is selected for rendering and at step 305 radiosity rendering is performed. In radiosity rendering, the light emission of each element is projected with respect to the camera position into a two dimensional image plane. At step 306 additional view-dependent rendering is added. Radiosity generates light emission values for elements, irrespective of view. This is known as view-independent rendering. However, certain aspects of a scene may require view-dependent lighting, for example, when a mirror or other highly reflective object is present. In order to achieve photo-realism, it is then necessary to combine the radiosity rendering procedure with light emission values determined by a view-dependent procedure, such as ray tracing. Given that only a small part of the resulting image is view dependent, the additional complexity of the ray tracing procedure need not result in an excessive computational increase. Alternatively, other, less realistic view-dependent procedures may be used for speed. When combined with the high degree of realism provided by radiosity, these can still result in a highly realistic overall image being created.

At step 307 a question is asked as to whether all of the frames for the clip have been rendered. When answered in the negative, control is returned to step 304, whereupon the next frame of the clip is selected and the radiosity rendering procedure 305 is repeated. Eventually, the question asked at step 307 will be answered in the affirmative and control will be directed to step 308. At step 308 a question is asked as to whether aspects of the existing scene need to be modified in order to improve the quality of the result. When answered in the affirmative control is returned to step 301. Eventually, no further modifications will be necessary and the question asked at step 308 will be answered in the negative.

Figure 4:
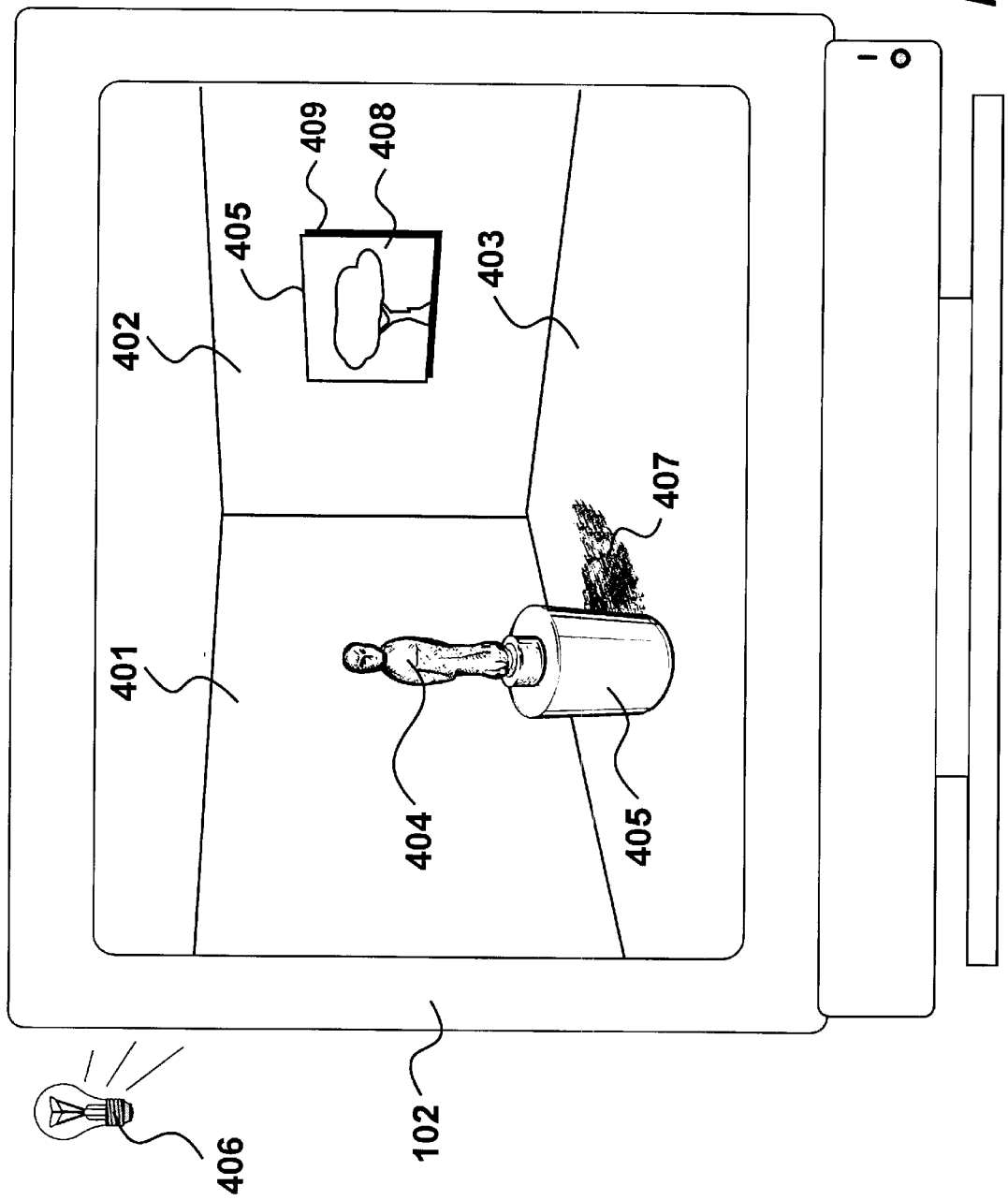
FIG. 4 details an image displayed on the monitor shown in FIG. 1, including several scene objects, that include two walls and a picture.

An example of a scene for rendering using radiosity is illustrated in FIG. 4. The scene consists of a room including a first wall 401, a second wall 402, and a floor 403. A statue 404 is located on the floor 403 and a picture 405 is shown hung on the wall 402. Radiosity simulation 302 is performed with reference to a light source, illustrated as light source 406, but which, because of the view point defined by the position of the virtual camera, does not itself appear as part of the resulting two dimensional image. The relative positioning of the light 406 and the statue 404 results in a shadow 407 being cast on floor 403. Similarly, given the position of light source 410, a frame 408 of picture 405 also casts a slight shadow 409 against the wall 402.

The presence of a light source in the scene results in a quantity of light energy being introduced. This light energy is scattered throughout the scene in a complex way, that is dependent upon the reflectivities, shapes and positions of objects within the scene. Radiosity simulation constructs a system of equations to represent these relationships, and is thereby able to determine light emission values that are very realistic.

Figure 5A:
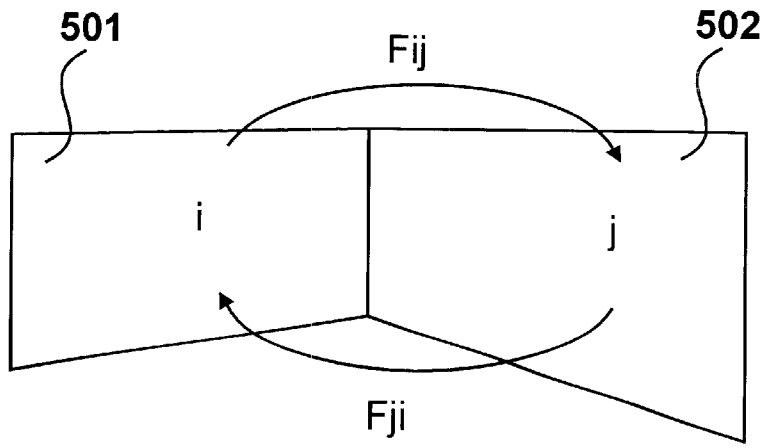
FIG. 5A summarises light energy transfer between a pair of objects, such as the two walls shown in FIG. 4.

The basic approach to performing the radiosity simulation 302 is outlined in FIGS. 5A, 5B, 5C and 5D. FIG. 5A details two elements 501 and 502 in a scene. The two elements are at right angles, such that it can be seen that not all of the light energy from element 501 will be transferred to element 502, and vice versa. The actual proportion of light energy transferred from one element to another is called a form factor. If element 501 is considered to be a source element i, and element 502 is considered to be a receiving element j, then the form factor for the transfer of light energy per unit area from i to j is denoted Fij. Similarly, the proportion of energy from element j transferred to element i is denoted Fji.

It can be seen from this simple example, that calculating the form factor requires a determination of the visibility of the source element with respect to the receiving element. This is made more complex if a third occluding element is present, which may totally or partially block light transfer between the elements for which the form factor is being calculated. In the event that a scene comprises only two elements 501 and 502, and one of these is a light source, it is possible to construct a simple pair of simultaneous equations which may be solved in order to obtain the light emission from each element without difficulty. In practice, however, a scene comprises many objects, each of which may need to be subdivided into a mesh of elements in order to obtain a sufficiently accurate representation of light variation across surfaces.

Given the form factors for all element interactions that are being considered, the total brightness from an element i is obtained by considering the sum of light energies directed at it from all of the other elements in the scene. This relationship is illustrated in FIG. 5B. The fundamentals underpinning the radiosity approach are derived from notions of conservation of energy and the total light energy flux emitted by a particular element is therefore considered as the product between a flux density value B and the area of the element A, identified as the product BA. Thus, for a particular element i, the energy flux radiated by this element is identified as the product $B_iA_i$ which is then considered as equal to the self emission of the element $E_i$ multiplied again by its area $A_i$ plus the sum of all light received from all of the co-operating elements. Thus, for every single co-operating element in the scene, each instance of which is denoted by the letter j, the amount of light received by element i is equal to the flux density $B_j$ of element j multiplied by the area $A_j$ of element j multiplied by the form factor $F_{ji}$ expressing the proportion of light transferred from j to i. The sum of these values is then multiplied by the reflectance $R_i$ representing the reflectance of element i.

As previously stated, the procedure is underpinned by notions of conservation of energy. Therefore, in accordance with this principle, the form factor $F_{ij}$ for the transfer of light energy from i to j, multiplied by the area $A_i$ of element i is equal to the form factor $F_{ji}$ representing the transfer of light energy from j to i multiplied by the area $A_j$ of j, as shown in FIG. 5C. This is known as the radiosity reciprocity equation. This relationship may be substituted into the equation of FIG. 5B to give the equation shown in FIG. 5D, which is known as the classical radiosity equation. In FIG. 5D, the flux density $B_i$ of element i is given by the source flux density $E_i$ of element i plus the reflectance $R_i$ multiplied by the sum for each element j, of flux density $B_j$ multiplied by the form factor $F_{ij}$.

The equation shown in FIG. 5D is the one used to determine light emission values for elements in a scene. In a simplistic approach, in a scene containing fifty thousand elements, the right side of this equation would have to be evaluated fifty thousand times in order to obtain an initial illumination value for a single element i. Thus, in order to calculate an initial illumination value for all fifty thousand elements, the right side of this equation must be evaluated fifty thousand times fifty thousand times. Furthermore, this large number is also the number of form factors that need to be calculated before the system of equations can be solved. A radiosity simulation utilising this simplistic approach is impractical for realistic image synthesis of scenes containing large numbers of elements.

Figure 6:
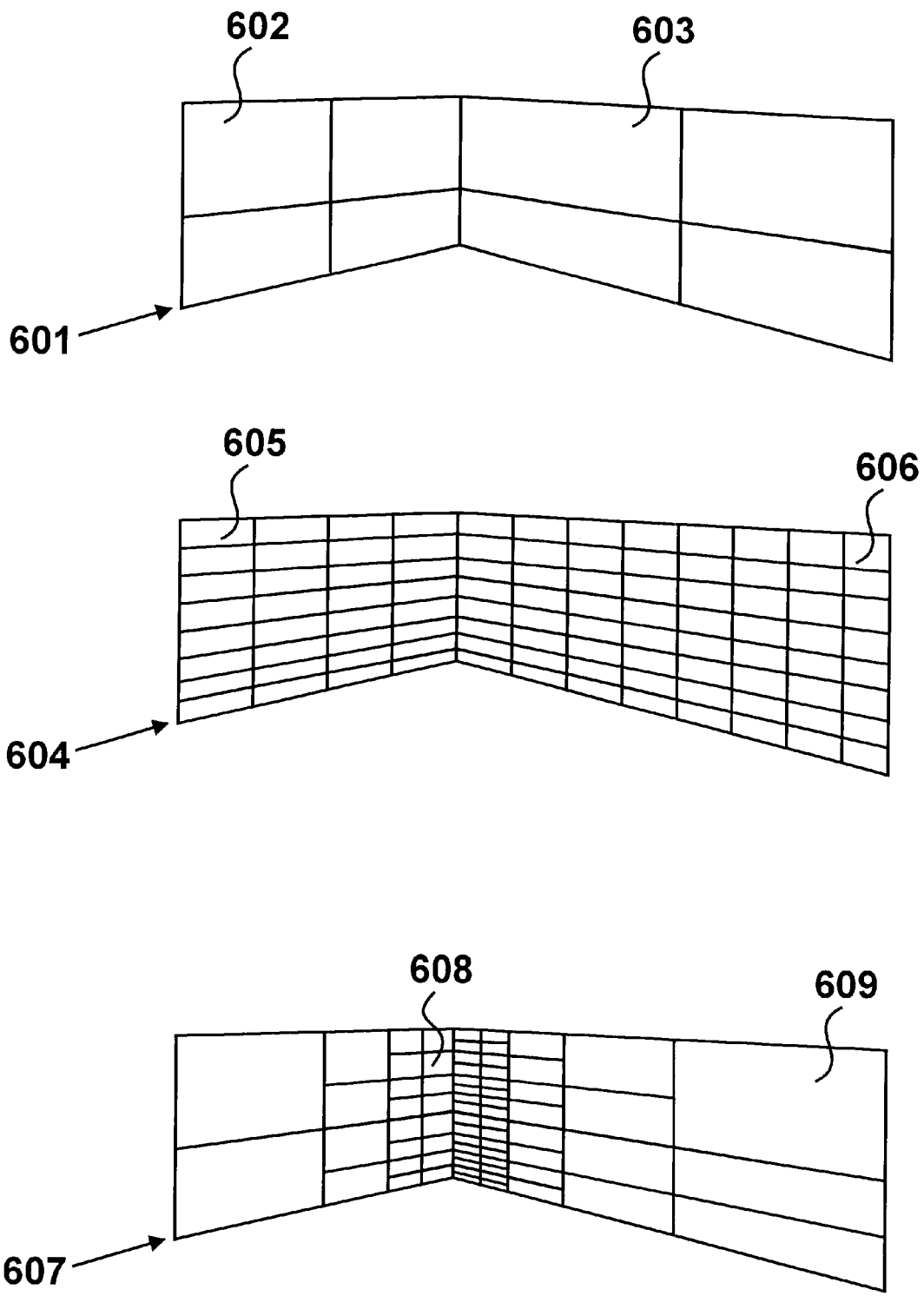
FIG. 6 indicates meshing strategies for the walls shown in FIG. 4.

A solution in which a relatively low number of elements are present is illustrated at 601 in FIG. 6. The image consists of two walls, in which the first wall has been subdivided into four mesh elements 602 and a second wall has also been subdivided into four mesh elements 603. The total number of elements present is relatively small, thereby reducing computational time when evaluating the equation in FIG. 5D, but this in turn results in a coarse image having visible artifacts. This problem may be understood by considering that, although illumination throughout the scene is non-linear, the illumination gradient where the walls meet changes faster than in the middle of a wall. Thus, by rendering the scene at the level of resolution shown at 601, even though a technique such as Gouraud shading may be used to interpolate lighting values across each mesh element, the shading close to the intersection of the walls will be unrealistic.

A solution to this problem is shown at 604. In this example, the walls are the same as those identified at 601 but each wall has been divided into substantially more mesh elements. Thus, a first wall is made up of sixty-four elements 605 with a similar sixty-four element mesh 606 being present in the second wall. This results in a significant improvement of the overall realism of the image but a major increase in terms of computational overhead. It can be seen that the complexity of solving the equation in FIG. 5D increases in proportion to the square of the number of elements present, when this approach is used. Furthermore, it may be understood that while the level of meshing has been increased where this is important, close to the intersection of the walls, it has also been increased unnecessarily in other areas.

Computational time may be reduced while maintaining image quality by taking a hierarchical approach as illustrated at 607. In this example, the walls have been divided into a large number of small elements, such as element 608, at positions where the interaction between the walls is greatest. Similarly, at a distance displaced from the intersection, the elements, such as element 609, are significantly larger. In this way, good image quality is obtained while computational overhead is reduced. This type of meshing is further enhanced by only evaluating form factors between mesh elements at an appropriate level of resolution. For example, a large mesh element at the edge of a wall need not evaluate multiple form factors for interactions between all the small mesh elements on the wall opposite that are close to the intersection. Instead, an appropriate coarse superset of the smallest mesh elements is selected for this interaction. Thus it becomes possible to consider the mesh as a nested hierarchy, such that, whenever possible, coarser mesh elements are used to define light exchanges. The subdivisions of coarse mesh elements are used when the predicted accuracy of light interchange is not sufficiently high. This technique is known as hierarchical radiosity. A data structure representing the nested levels of mesh elements is known as a multi-resolution representation of the radiosity equation.

Hierarchical radiosity may still be time consuming, as there may be many thousands of objects within a scene. Thus, regardless of the efficiency of the hierarchical mesh, there are still a minimum number of interactions that are defined to be the square of the number of objects. In typical photo-realistic scenes, this number may still be prohibitively high. In order to reduce the computation still further, additional procedures have been established in order to extend hierarchical radiosity. In radiosity with clustering, certain combinations of objects, such as the statue 404 shown in FIG. 4, and its base 405, are considered as forming a single cluster element. Interactions with distant elements, such as those comprising a wall 402, may then be expressed by the use of a single form factor, because the light reaching the wall from the statue is weak. The difference between the statue as it is, and the statue represented, for example, as a single radiating cylinder, will be below the required accuracy threshold when calculating the form factor for transfer from the statue to the wall. Closer surfaces, such as wall 401, may need to consider the statue as comprising a number of elements, each having different light emission values, in order to determine local light emission gradients with sufficient accuracy. The combination of hierarchical radiosity with clustering reduces the number of element relationships from n squared to approximately n log n, where n is the number of mesh elements in the scene. It is this reduction in complexity that has enabled the radiosity technique to be considered for use in many applications.

In the example shown in FIG. 4, the shadow cast by the statue 404 on the floor 403 can only accurately be represented by subdividing the floor into fine mesh elements around the region of the shadow. Similarly, the shadow cast by the picture 405 will require a finer level of mesh detail in order to render it accurately. This fine level of mesh detail results in an increase in the computational overhead required in calculating an increased number of form factors, and in solving the resulting multi-resolution representation of the radiosity equation. In the present invention, selected elements may be set as being non-occluding to facilitate an increase in the speed of the radiosity simulation procedure. Thus, in the present example, statue 404 is a prominent feature. Therefore lighting calculations are performed on the basis that background elements are occluded by the foreground statue. In this way, the lighting calculations will result in the generation of shadow 407. In reality, picture 405 also casts a shadow 408 although the importance of this shadow, in terms of the realism of the overall image, is less than that of the shadow of the statue 404. Consequently, to reduce the level of meshing required, and to thereby speed up light emission calculations, selected elements within the image may be set as being non-occluding and, in this example, the elements of picture 405 are set as being non-occluding.

The result of setting the picture 405 to be non-occluding results in the same quantum of light energy being reflected from both the picture 405 and the portion of the wall 402 lying behind the picture. In reality, this portion of the wall should be occluded by picture 405, but as previously stated, in this example, the picture 405 has been set as non-occluding. As is known in the art, this results in the total light energy in the scene increasing, and this, in turn, can prevent the radiosity simulation from converging to a solution.

When a small area of a scene is specified as being non-occluding, significant problems can be avoided. However, when a large enough area of the total scene is specified as non-occluding, the amount of light energy circulating in the system may become greater than the amount of light energy supplied, thereby violating the law of conservation of energy. As this condition is approached, the overall brightness of the elements' surfaces increases unnaturally, and more iterative steps are required to solve the multi-resolution representation of the radiosity equation. It is possible to reach a condition where the system becomes unstable, when it is no longer possible for the radiosity equation to converge to a solution.

In accordance with the present invention, the level of reflected light is adjusted by modifying the light reflections in response to identifying the presence of non-occluding elements. In this way, it is possible to enhance overall speed performance and reduce the visibility of undesirable artifacts.

Figure 7:
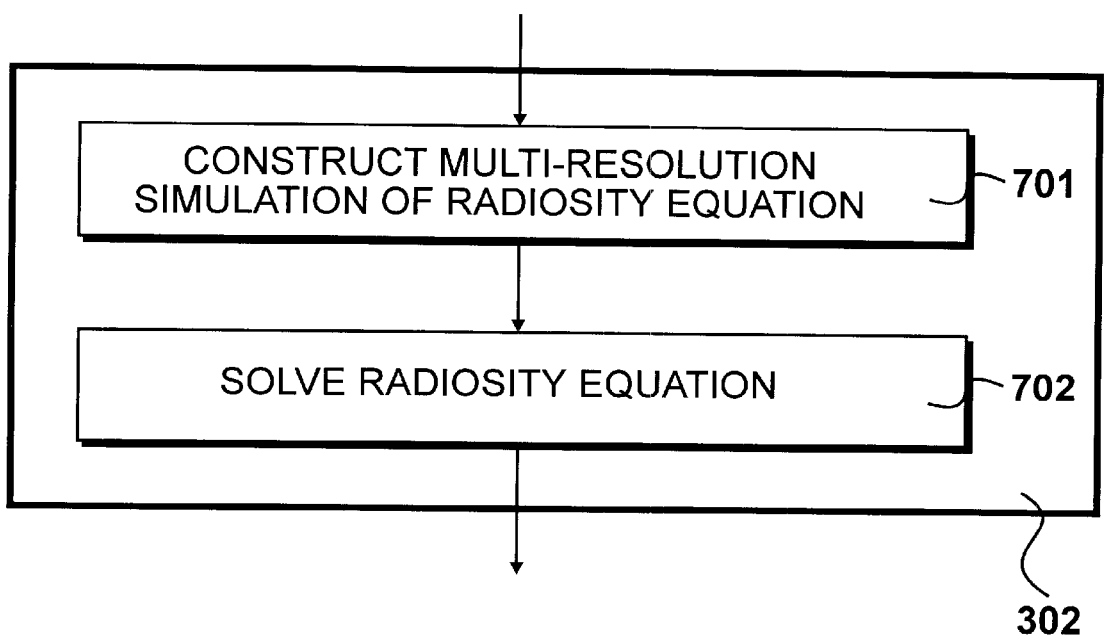
FIG. 7 details the process of radiosity simulation, shown in FIG. 3, including processes of constructing a multi-resolution representation of the radiosity equation, and solving the radiosity equation.

Procedure 302 for performing radiosity simulation is detailed in FIG. 7. At step 701 the multi-resolution representation of the radiosity equation is constructed. At step 702 the radiosity equation is solved.

Figure 8:
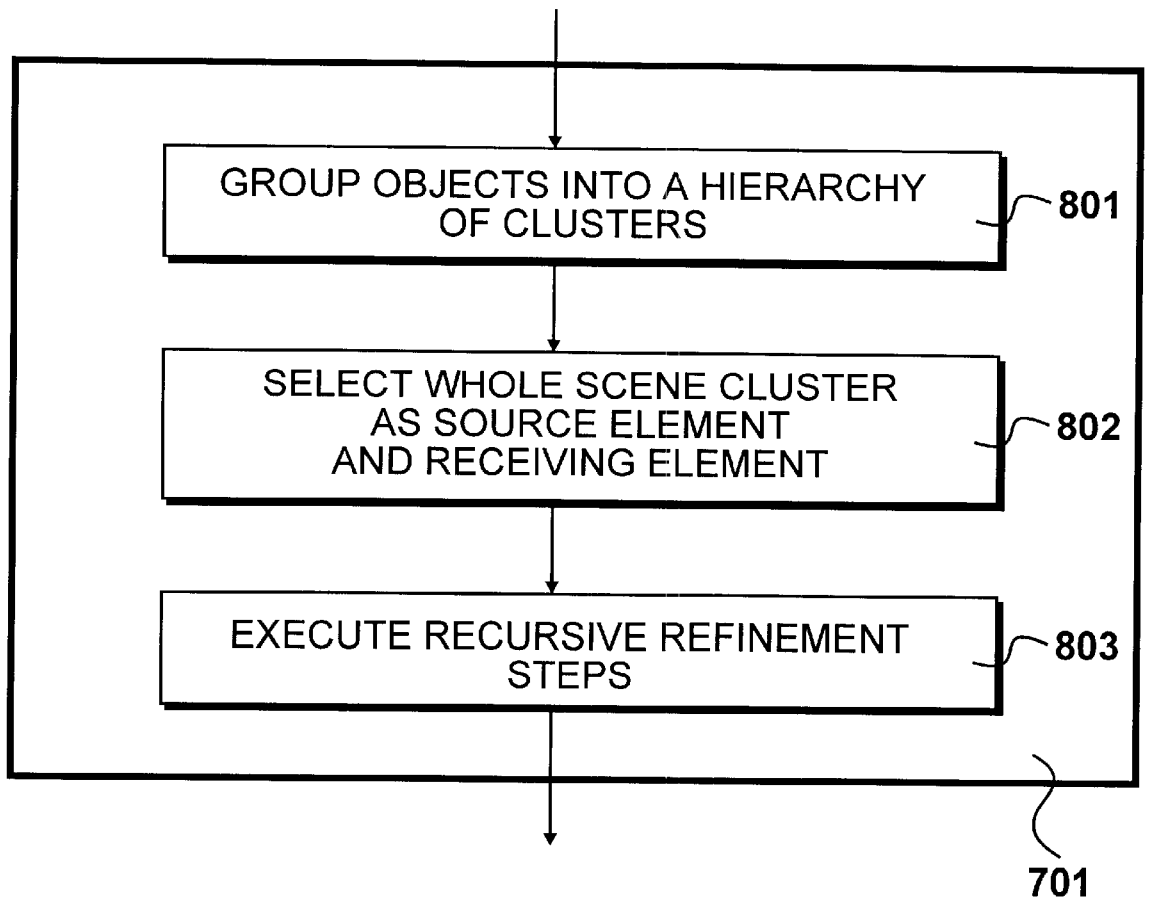
FIG. 8 details the process of constructing the multi-resolution representation of the radiosity equation shown in FIG. 7, including a process of executing refinement steps.

Procedure 701 for the construction of a multi-resolution representation of the radiosity equation is detailed in FIG. 8. At step 801 all of the scene is analyzed such that a hierarchy of cluster elements is generated. At the top of this hierarchy is a cluster that represents the whole scene. Below this cluster are clusters that represent distinct groups of objects, related by their physical proximity. A method for hierarchical clustering of objects is described in "A Clustering Algorithm for Radiosity in Complex Environments", by Brian Smits, James Arvo and Donald Greenberg, Proceedings of SIGGRAPH '94, pp. 435–442, 1994. The lowest level of the cluster hierarchy is the object level. Objects themselves may be considered as elements, in the same way as clusters, and the mesh elements which are created at a later stage of processing.

At step 802, the whole scene cluster at the top of the hierarchy of clusters, is selected as being both a source element and a receiving element. Thus, it is considered as transferring light onto itself. This starting point serves to initiate the recursive refinement process of step 803. At step 803, the whole scene is considered initially as emitting light to itself. The recursive refinement process considers this as resulting in an excessively rough approximation of light shading, and so recursively considers the component clusters and objects for light interactions. Furthermore, the recursive refinement process at step 803 creates mesh elements for the surfaces of objects wherever this is necessary in order to represent the light shading to a sufficient level of accuracy.

Figure 9:
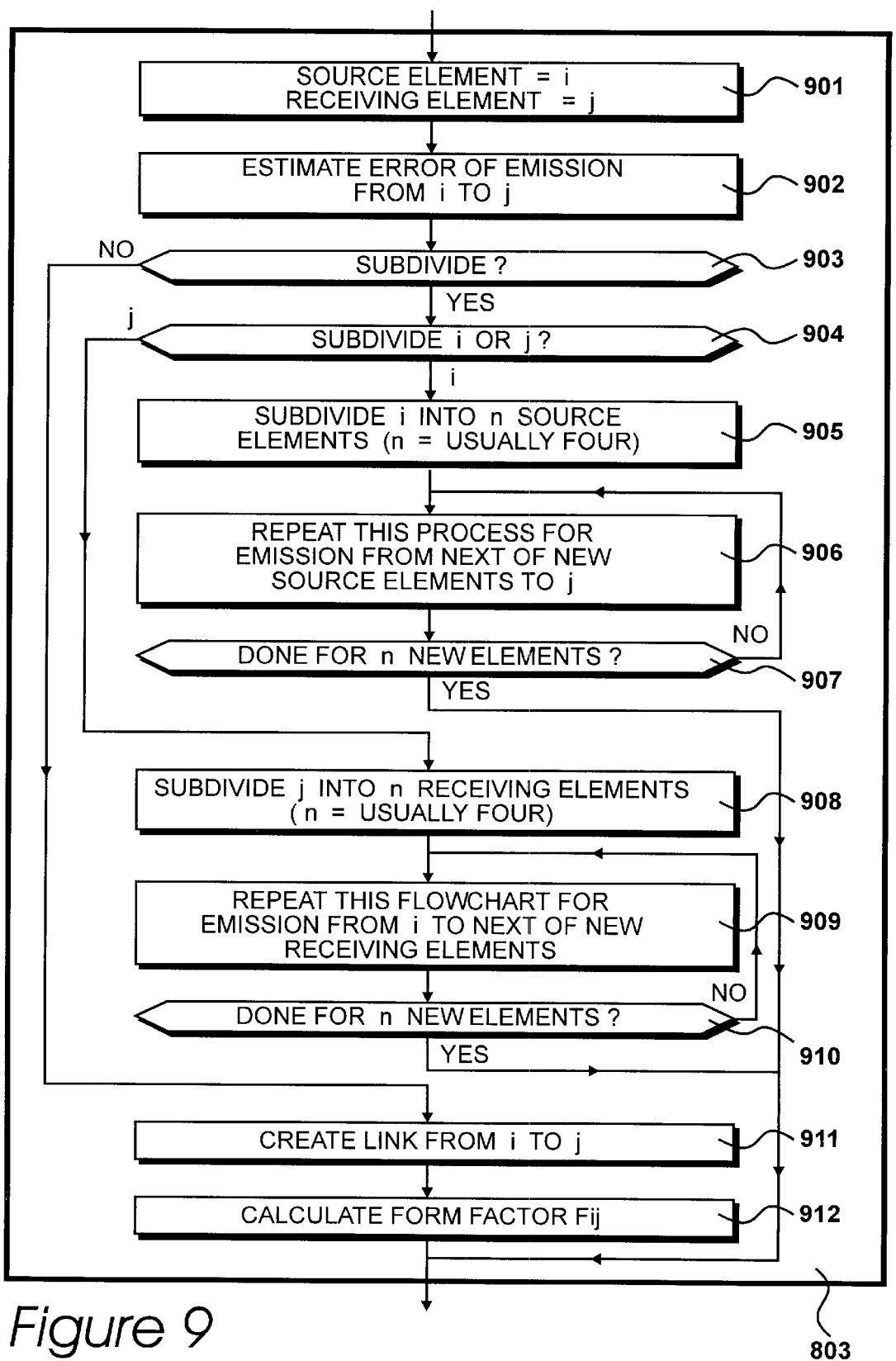
FIG. 9 details the process of executing refinement steps shown in FIG. 8.

Recursive refinement process 803 shown in FIG. 8 is detailed in FIG. 9. A source element and a receiving element will have been selected by either processes 802, or subsequent steps 906 or 909. These are now initially denoted as source element i and receiving element j at step 901. At step 902 an error is determined for the transfer of light from i to j wherein i and j are uniformly emissive. Upon initial execution of the process shown in FIG. 9, as indicated at step 803, the source element i and the receiving element j are both the same, and are the cluster element that represents the whole scene. Inevitably, the error determined for using this light path as the sole radiosity transaction for shading the entire scene results in a very large error in the quality of surface shading. Thus, on the first execution of the process shown in FIG. 9, as represented at step 803, the predicted error generated at step 902 will be very high.

At step 903 a question is asked as to whether a subdivision into further elements is required in order to improve the quality of the simulation. If the estimated error, calculated at step 902, is considered to be sufficiently small, subdivision is not required and the question asked at step 903 is answered in the negative. The question asked at step 903 is also answered in the negative if, within the constraints of the system, it is no longer possible to facilitate subdivision into smaller elements. Alternatively, if the error value estimated at step 902 is too high, the question asked at step 903 is answered in the affirmative.

At step 904 a question is asked as to whether it is appropriate to subdivide the source element i or to subdivide the receiving element j. Again, an error estimation approach is taken and a selection is made which results in the lowest estimated error, or the predicted highest simulation quality, being produced. If a selection is made to the effect that the source element i is to be subdivided, i is subdivided into source elements at step 905. Subdivision of a cluster results in an identification of component cluster elements, and/or component object elements. However, if the element that is being subdivided is an object, the subdivision process at step 905 may create new elements. Typically, when a mesh is being created, the element will be split up into four new elements. At subsequent levels of recursion, these mesh elements may themselves be further split into usually four new elements and so on until the desired level of resolution is achieved in order to attain the required level of quality.

If an assessment is made at step 904 to the effect that the receiving element j is to be subdivided, control is directed to step 908 and a subdivision of j into receiving elements, in a similar manner to step 905, is performed at step 908.

At step 906, the steps of the overall process shown in FIG. 9, and of which step 906 is a part, are repeated by considering each of the newly identified element subdivisions as a source element. This step is a recursive step, and when this step is performed, at the next level of recursion, it may be understood that each of the newly identified source elements is then considered in its turn as element i, as determined at step 901. On exiting the recursive loop at step 906, control is directed to step 907, where a question is asked as to whether any additional newly identified elements remain to be considered as emitters. If answered in the affirmative, control is directed back to step 906, where the next newly identified element is considered. Alternatively, if all new elements have been considered, the exit condition for the process is satisfied.

Similar processes are performed at steps 908, 909 and 910, where newly identified elements are considered as receiving elements. In recursive step 909, each newly identified receiving element is considered as a receiving element j at step 901 in the next level of recursion.

Subdivisions continue to be created recursively until the question asked at step 903 is answered in the negative. At this point, a specific element has been defined as an appropriate source element and an appropriate element has been defined as a suitable receiving element. At step 911 a link is created between these elements which establishes that a transfer of light is considered as being effected between these elements for the purpose of radiosity calculations. Thereafter, at step 912, a form factor Fij is calculated representing the interaction in terms of light being transferred from the source element i to the receiving element j.

After the execution of step 912 it is likely for the procedure to be within a recursive operation. Under these circumstances, emerging from step 912 is equivalent to emerging from step 906 or step 909.

Eventually, all of the elements will have been considered from the clusters at the highest level down to the smallest newly created mesh elements. This results in links and form factors being generated across a variety of levels; for example, between large clusters and small elements, between clusters, and between small mesh elements. In total, this complex network of relationships defines light interactions between all surfaces in the scene, but at levels of resolution appropriate to the level of quality that is required. Thus, less links are created when a chair cluster interacts with a distant wall cluster, than if the component objects of these clusters were to be considered, in all their combinations, as an appropriate description for light energy transfer. These links, therefore, are established between appropriate levels in the hierarchy of elements, such that interactions are only considered which result in equal to or just above the required level of image quality.

Figure 10:
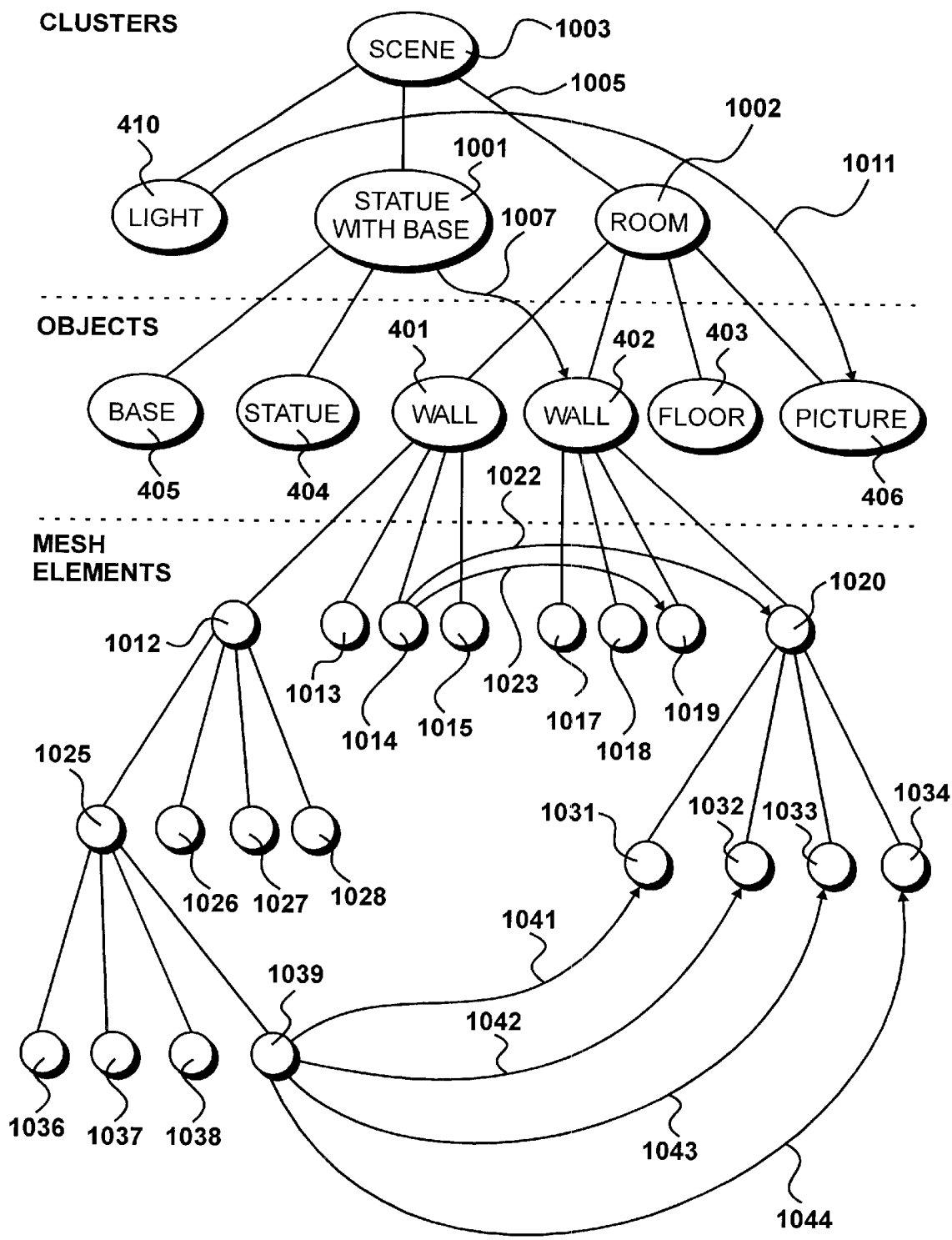
FIG. 10 illustrates data structures arising from executing the refinement process shown in FIG. 8 with respect to the objects indicated in FIG. 4.

Operations performed in accordance with the recursive procedures illustrated in FIG. 9 result in a linked structure being developed of the type represented in FIG. 10. Objects at a first level representing an object within the scene shown in FIG. 4 may be recursively subdivided into constituent elements until a level is reached at which the smallest required mesh elements are established. Objects include the statue base 405, the statue 404, the first wall 401, the second wall 402, the floor 403 and the picture 406. Within the data structure, these objects are clustered so that the base 405 and the statue 404 may be considered as a statue with base cluster 1001. Similarly, the first wall 401, the second wall 402, the floor 403 and the picture 406 are considered as a room cluster 1002. The statue with base cluster 1001 and the room cluster 1002 are then unified into a scene cluster 1003, which also includes the light source 410.

In the illustration shown in FIG. 10, straight lines, such as 1005 connecting the scene 1003 with room 1002, represent a geometric relationship between elements. Radiosity links, generated in step 911 in FIG. 9, are illustrated by curved arrowed lines, such as line 1007 illustrating an interaction between the statue and base cluster 1001 with the second wall object 402. This interaction is expressed by a form factor associated with the link that represents the amount of light transferred from the statue with base cluster 1001 to the wall 402.

The data structure illustrated in FIG. 10 does not attempt to be complete, and only shows a small fraction of the structure that would be created in order to fully represent the interactions in a typical scene such as the one shown in FIG. 4.

As an example, the recursive refinement procedure detailed in FIG. 9, will endeavour to define an interaction between the first wall 401 and the second wall 402. On this occasion, a calculated error value given at step 902 is too high for form factors to be used in terms of wall 401 transferring light to wall 402 and in terms of wall 402 reflecting light back to wall 401. Consequently, in order for the required level of quality to be achieved, it is necessary for these walls to be recursively divided into smaller elements and for the interactions to be defined in terms of appropriate element levels in preference to the interaction directly between the wall objects. The wall 401 has been subdivided into four mesh elements 1012, 1013, 1014 and 1015. Similarly, wall object 402 has been subdivided into mesh elements 1017, 1018, 1019 and 1020.

Link 1022 shows that it is possible to calculate a valid form factor with element 1014 being a source element and element 1020 being a receiving element. Similarly, link 1023 shows that it is possible to calculate a valid form factor with element 1014 as a source element and element 1019 as a receiving element. However, the required level of quality cannot be achieved if form factors are established for element 1012 as a source element and element 1020 as a receiving element. In order to generate appropriate calculations with respect to this portion of the scene, it is necessary to further recursively subdivide these elements.

Thus, when considered as a source element, element 1012 is subdivided into four elements 1025, 1026, 1027 and 1028. Similarly, as a receiving element, element 1020 is further subdivided into elements 1031, 1032, 1033 and 1034. However, further recursion has indicated that element 1025 requires further subdivision, resulting in the generation of mesh elements 1036, 1037, 1038 and 1039. At this level, it is now possible to make progress and it has been established that a form factor can be calculated with element 1039 as a source element and element 1031 as a receiving element, illustrated by link 1041. Similarly, link 1042 shows that element 1039 may be a source element and element 1032 may be a receiving element. Further recursion on the receiving side is not required and element 1020 is fully satisfied as a receiving element in relation to element 1039 by links 1043 and 1044 connecting elements 1033 and 1034 respectively.

The relationship with mesh element 1039 and elements 1031 to 1034 shows that the recursive refinement steps of FIG. 9 have been performed to a sufficient depth in order to provide the level of quality required.

FIG. 10 presents a graphical illustration of the type of data structure that is used for the multi-resolution representation of the radiosity equation. It will be understood that a true representation for a typical scene containing many thousands of objects would be impossible to present in the form of an illustration, and FIG. 10 is intended purely as an indication of data structures that are being used.

Figure 11:
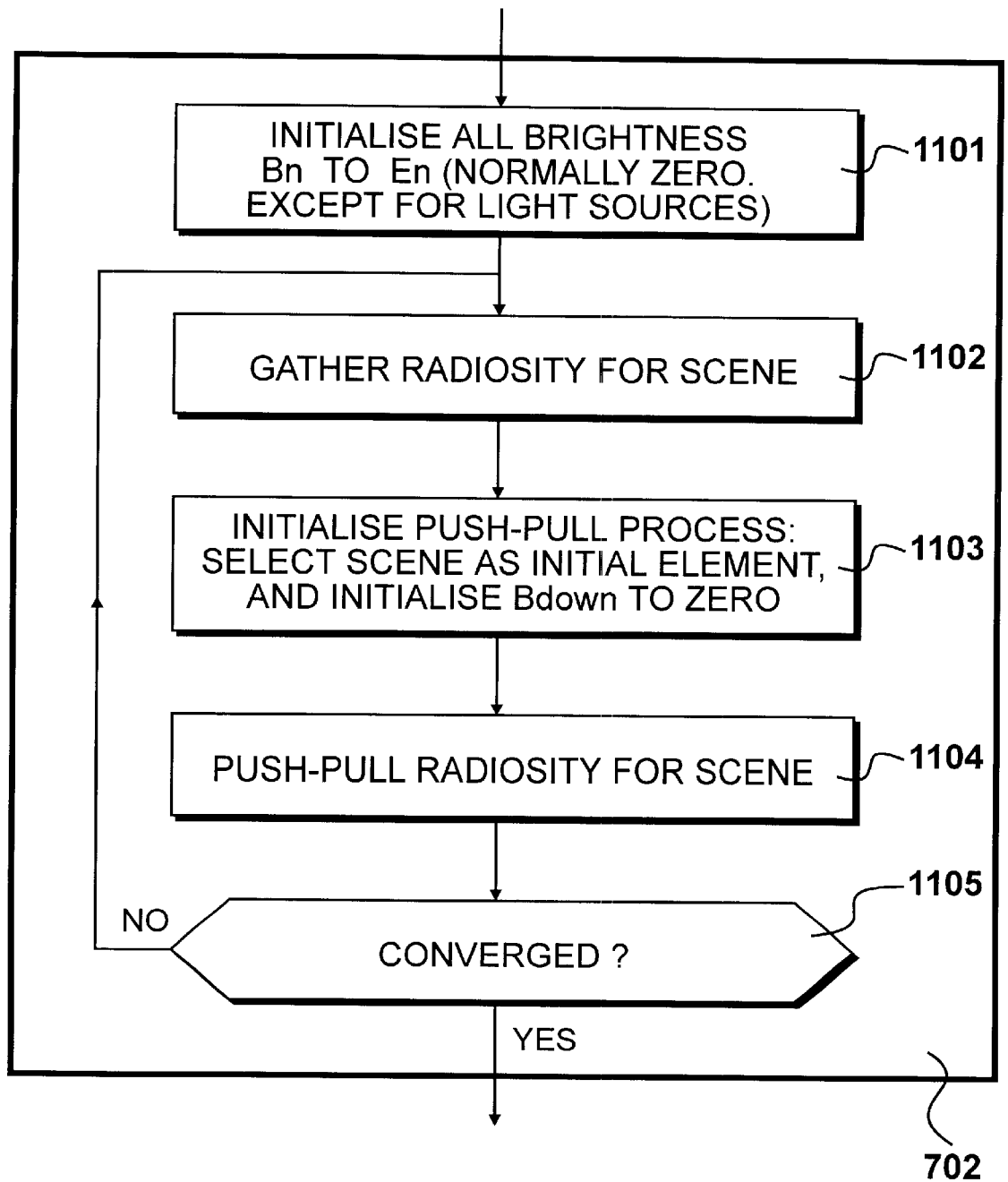
FIG. 11 details a prior art solution for the process of solving the radiosity equation shown in FIG. 7, including a process of gathering the radiosity for the scene, and a process of push-pull radiosity for the scene.

Procedure 702 for the solving of the radiosity equation is detailed in FIG. 11. Each element and object in the scene has an illumination value, and it is the purpose of the radiosity equation to determine an illumination value Bi for all n elements within the scene. The illumination values will be made up from self emissions from the elements or objects themselves, which will be zero except for light sources, in combination with contributions from other elements to which links have been constructed of the form indicated in FIG. 10.

At step 1101 all illumination values for all of the elements Bn are initialised to be equal to their self emission values En which, with the exception of the light sources, will be zero.

At step 1102 illumination contributions for the scene are gathered. For each element, incoming contributions, defined by incoming links, are summed to provide an initial illumination value. These illumination values are not complete in that incoming links occur at different levels. Thus, referring to FIG. 10, element 402 receives a contribution from element 1001 via link 1007. In addition, its sub-elements 1017 to 1020 also receive contributions from element 1014 etc. such that, the gathering process identified at step 1102 will result in values being accumulated at element 402 and for example, values being gathered at element 1020. However, in reality, element 1020 represents a portion of element 402 and the illumination of element 402 should be equal to the area average of the illumination values of its sub-elements 1017 to 1020.

In order to determine accurate values for the elements, taking account of contributions made at different mesh elements levels, a push-pull radiosity procedure is performed at step 1104. In order to initiate this procedure a variable Bdown is set to zero at step 1103.

After completing the push-pull radiosity operation for the first time, processes 1102, 1103 and 1104 are repeated, such that a first iteration may be compared against a second iteration to determine the extent to which estimated illumination values are converging to a stable solution. If the difference between results of these iterations is still considered to be too large, thereby indicating that convergence has not taken place, a question to this effect is answered in the negative at step 1105, and a further iteration of steps 1102 to 1104 is repeated. The question at step 1105 is asked again and ultimately sufficient convergence should take place such that the question asked at step 1105 is answered in the affirmative. Typically eight to twelve repetitions of these steps will be required in order to reach a suitably stable set of illumination values.

Figure 12:
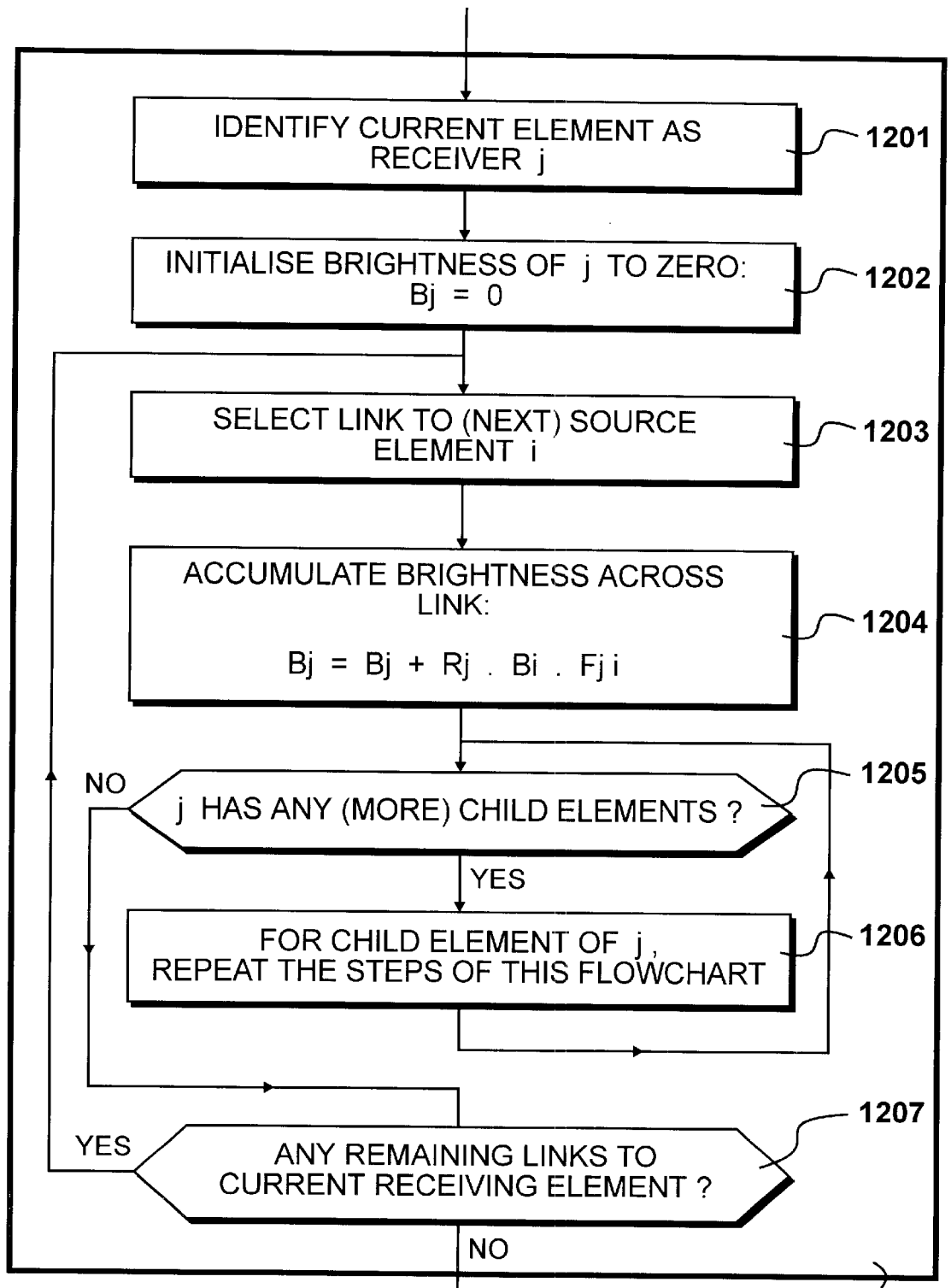
FIG. 12 indicates a prior art solution for the process of gathering the radiosity for the scene shown in FIG. 11.

A known method for step 1102, gathering radiosity for the scene, shown in FIG. 11, is detailed in FIG. 12. At step 1201 a current element is identified as a receiver j and at step 1202 the illumination of j is initialised to zero.

A loop is initiated at step 1203 where the next link to a source element, identified as element i, is selected. At step 1204 the illumination across the link from element i to element j is accumulated and at step 1205 a question is asked to whether element j has any more child or sub-elements to be considered. If this question is answered in the affirmative, the whole procedure 1102 is recursively called at step 1206. This repeats until all of the sub-elements have been considered, whereafter at step 1207 a question is asked as to whether any remaining links to the current receiving element are present. When answered in the affirmative, control is returned to step 1203 and the next link to the receiving element j is selected.

Figure 13:
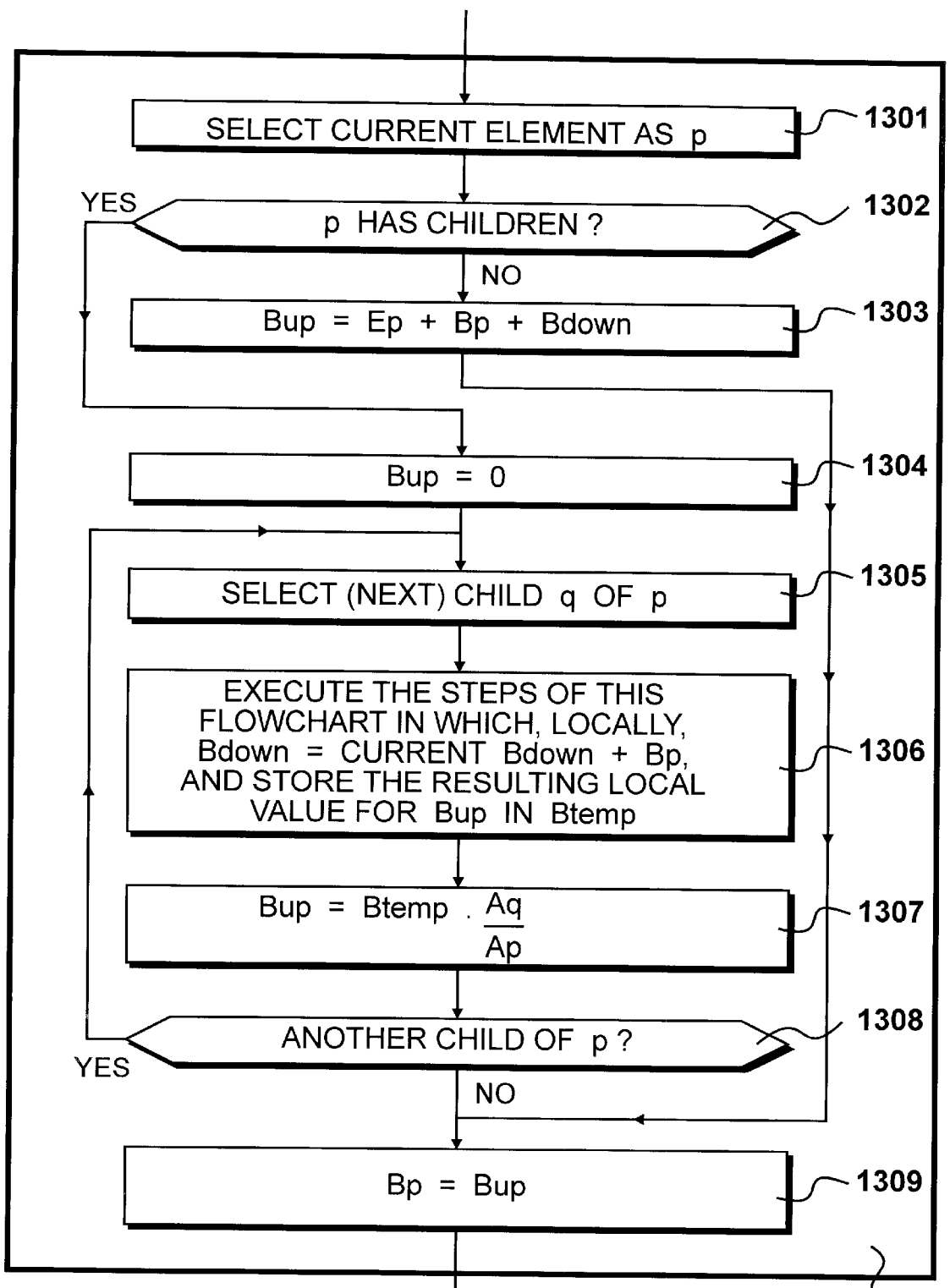
FIG. 13 indicates a prior art solution for the process of push-pull radiosity for the scene shown in FIG. 11.

A known procedure for step 1103, the push-pull process for the illumination in the scene, shown in FIG. 11 is detailed in FIG. 13. At step 1301 the current element is considered as p and on the first loop the current element will be that of the highest level of the structure shown in FIG. 10 which, in this example, would be the whole scene represented by cluster 1003. At step 1302 a question is asked as to whether p, selected at step 1301, has child elements and when answered in the affirmative control is directed to step 1304. At step 1304 a variable Bup is set equal to zero, whereafter at step 1305 a next child q of selected element p is selected.

Thereafter, the whole of the procedure shown in FIG. 3 is recursively executed at step 1306. Within the execution of the recursive step, a local value for Bdown is set equal to the current value for Bdown plus Bp, that is the illumination gathered directly at the parent element p. The result in terms of a local value for Bup is then stored in variable Btemp. Thereafter, control is directed to step 1307.

At step 1307 variable Bup is set equal to value Btemp, the local value determined by the recursive call to procedure 1306 which is then multiplied by the area of the child divided by the area of the parent to compute an area average.

At step 1308 a question is asked as to whether another child of p is present and when answered in the affirmative control is directed back to step 1305. When all of the children have been considered, the question asked at step 1308 will be answered in the negative and control is directed to step 1309, resulting in a new value for Bp being set equal to Bup. When the question asked at step 1302 is answered in the negative, to the effect that the current element p does not have any children, Bup is set equal to Ep, the self emission value for element p, plus Bp plus Bdown, and control is directed to step 1309.

In an alternative embodiment, the steps shown in FIG. 7 are performed iteratively, as part of a loop. The purpose of this is to facilitate a more accurate determination of error values, upon which decisions are made about the level of meshing that is to be performed. In the iterative process, during the first pass of the steps shown in FIG. 7, at step 701, the multi-resolution representation is constructed for a first error tolerance, eps_1, and then at step 702, the radiosity equation is solved to yield a first solution. On the next iteration, the error tolerance is reduced, to eps_2. However, the multi-resolution representation constructed at step 701 in the previous iteration is already valid down to the eps_1 level of error tolerance. Thus, to continue to the reduced level of error tolerance, given as eps_2, the pre-existing multi-resolution representation can be continued by further addition of mesh elements and establishing links, thus there is no wastage in having to recalculate existing data structures. A third and additional iterations may then be performed.

A first purpose of this multi-pass method is to enable a rough display of the radiosity solution to be previewed more quickly than if the fully detailed solution is created in one stage. It is possible, then, for an operator to identify obvious deficiencies at an early stage. A further advantage is that the first, or early solutions, provide subsequent solutions with information about the magnitude of light transferred across links, and not just the magnitude of the form factors. This information can be used to improve the accuracy by which errors are predicted, such that even pairs of surfaces with large form factors do not need to be respectively meshed if the actual light that would be transferred across those links is insignificant. This form of iterative refinement is known as BF refinement.

The hierarchical sub-division as illustrated at 607 is directed towards dividing regions into very small elements where maximum benefit is derived from this division, while in other areas retaining relatively large elements so as to reduce computation demands. Problems with this approach arise if the procedures detailed in FIG. 9 result in unnecessary subdivisions being produced or require many subdivisions to be produced, to avoid the creation of artifacts, while ultimately giving very little additional benefit to the overall quality of the image. A problem of this type would occur in the image shown in FIG. 4 with the presence of the picture 406. The picture 406 casts a shadow against the wall 402, therefore if the shadow is to be correctly represented, a sufficient number of elements must be provided in the vicinity of the shadow.

Figure 14:
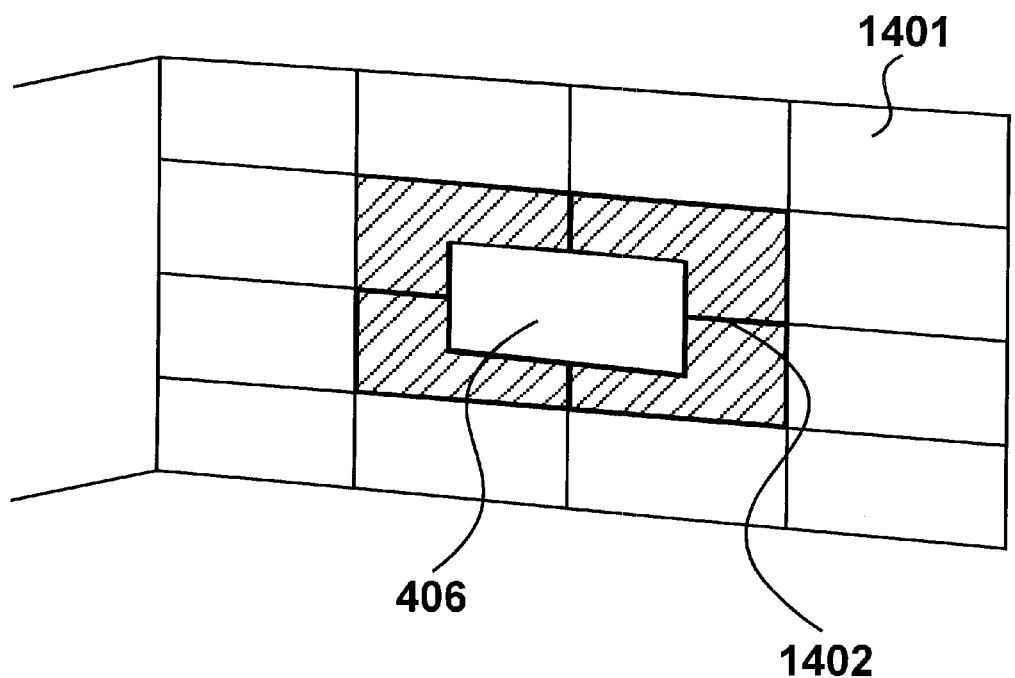
FIG. 14 details unwanted shadow artifacts resulting from a coarse radiosity mesh rendering for shadows around the picture shown in FIG. 4.

A situation in which insufficient elements are present in the vicinity of the picture 406 is shown in FIG. 14. In FIG. 14, wall 402 has been divided into sixteen elements 1401. A subsequent rendering process based on elements of this size result in a shadow being generated, due to the presence of picture 406 of a shape substantially similar to that illustrated by shadow 1402. Clearly, the computed shadow covers a much larger area than the shadow that would actually result in reality. Therefore the calculation with elements of size 1401 results in the introduction of undesirable artifacts.

The problem of shadow 1402 may be resolved by dividing the elements further such that four elements of size 1401 close to picture 406 are each in themselves divided into sixteen elements to produce much smaller elements 1501. With elements of this size, a much smaller shadow shape 1502 results but in order to achieve this, a significantly greater computational overhead is required.

Figure 15:
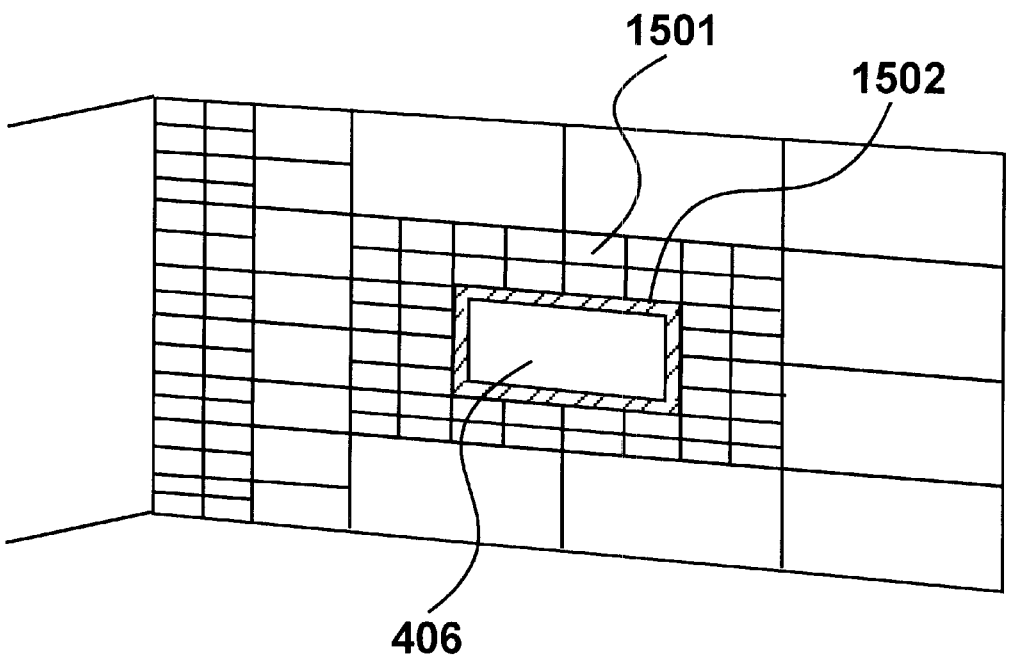
FIG. 15 details reduced shadow artifacts resulting from a finer radiosity mesh rendering for shadows around the picture shown in FIG. 4.

A known solution to the problem identified in FIGS. 14 and 15 is to perform the radiosity calculations without taking account of generating a shadow for the picture 406. This is achieved by considering the object 406 as being non-occluding. In this situation, light reflections from the picture occur as normal. However, the same quanta of light that are reflected from the picture now also reach the wall behind, and are reflected from it.

Figures 16, 17, 18:
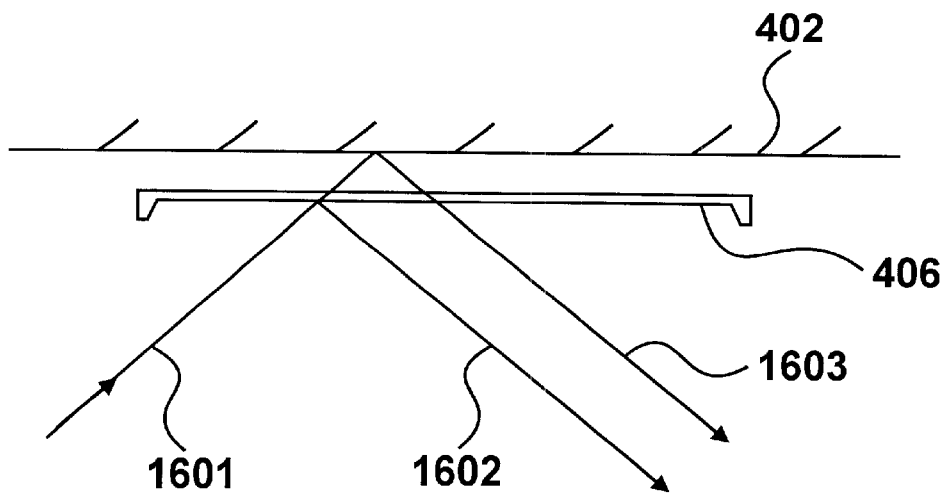
FIG. 16 illustrates a problem with the prior art solution to the artifacts indicated in FIG. 14 and FIG. 15.
FIG. 17 indicates a mathematical property for radiosity simulations.
FIG. 18 illustrates a relationship for avoidance of problems indicated in FIG. 16.

The resulting effect of considering picture 406 to be non-occluding with respect to wall 402 is shown in plan view in FIG. 16. Light, indicated by arrow 1601 is directed towards an element of picture 406 and would normally be reflected by said element of picture 406 and only reflected by said element of picture 406. This results in light being reflected from the element of picture 406, indicated by arrow 1602. However, if the picture 406 is set as being non-occluding, light 1601 will also pass through picture 406 and reflect from wall 402, resulting in a second reflection of light represented by arrow 1603. In reality, this clearly contravenes the law of conservation of energy, in that the total amount of light may have been increased.

The reflection of light is determined by the reflectivity of surfaces. Thus, given that both surfaces may have a reflectivity coefficient Ri of less than one half, the total amount of light energy in the system will not necessarily contravene the law of conservation of energy. Nevertheless, visible unwanted artifacts may result, such as the over-brightening of local reflections from nearby objects in an unrealistic fashion. Thus, by treating surface 406 as being non-occluding in this way, it is possible to significantly reduce the number of elements required to represent wall 402 without introducing noticeable artifacts of the type illustrated by shadow 1402.

When a relatively small number of non-occluding surfaces are present within a scene, the overall effect of artificially increasing the total energy output does not result in significant undesirable artifacts being introduced into the image. However, as the number of non-occluding surfaces is increased, the overall brightness of the image will become unrealistic, effectively introducing new artifacts which degrade the overall quality of the image. As described with reference to FIG. 11, the radiosity equation is solved by reaching a point of convergence and when the overall energy within the scene is increased, by the presence of non-occluding surfaces, further iterations may become necessary in order to achieve the necessary level of convergence. Furthermore, as further non-occluding surfaces are introduced a point will be reached at which convergence may no longer be possible.

Consequently, in order to produce any output at all, the number of non-occluding surfaces has an upper bound in known systems although this will be determined by trial and error. Thus, there is a limit to the total area within a scene that may be identified as non-occluding before serious problems occur. However, in some situations, in order to produce images from such a scene, a significant number of elements may be required such that the processing power required for the construction of the multi-resolution simulation requires a significant overhead at which point known radiosity techniques may not provide a desirable solution to generating the required image.

In summary, if too few non-occluding surfaces are included, the construction of a multi-resolution simulation may take too long. Alternatively, if too many non-occluding surfaces are present, unwanted artifacts may result, and it may be difficult or impossible to solve the radiosity equation 702.

The problem of non-occluding elements is overcome by the present invention, in which a level of reflected light is adjusted by modifying light reflections, in response to identifying the non-occluding elements. In particular, in the preferred implementation, the level of light is reduced to be substantially similar to that achieved when the non-occluding elements are occluding. Thus, referring to FIG. 16, elements of picture 406 remain non-occluding such that the two reflections 1602 and 1603 are still present. However, the individual light reflections for the whole image are effectively normalized such that the total light level is effectively reduced to be substantially similar to that which would have been achieved if the elements of picture 406 were non-occluding. This is achieved by making modifications to procedures 1102 and to procedures 1104.

This solution allows non-occluding elements to be present. FIG. 16 emphasizes the difference between a non-occluding element and a transparent element. With a non-occluding element, elements behind the non-occluding element still react with the incident light, producing a reflection such as reflection 1603. However, if light were being reflected in this way, due to a transparent element 406, one would not expect reflection from the transparent element itself. Alternatively, the foreground element could be partially transparent, resulting in part of the light being reflected by the foreground element, and part of the light being reflected by the background element. However, with a non-occluding element, reflections occur from both surfaces as if each were reacting with the same quantum of incident light. Clearly this contravenes the law of conservation of energy, a representation of which is illustrated in FIG. 17.

As shown in FIG. 17, the summation of all form factors Fji for i=1 to the number of elements in a closed system, is equal to unity. In the known solution, as shown in FIGS. 12 and 13, the total amount of light energy is increased by specifying certain surfaces as being non-occluding, even though they are not transparent. Therefore the conservation of energy law is violated and the equation shown in FIG. 17 equates to a result greater than unity.

The standard radiosity equation is shown in FIG. 5D, and an implementation of this equation in the presence of specified non-occluding surfaces results in a total Fji being calculated with a value greater than unity. This current problem is resolved in accordance with the present invention as illustrated in FIG. 18. In the invention, the radiosity equation is normalized by dividing the summation of the product of Bi and Fji by the summation of Fji, thus ensuring that the totality of energy within the system does not contravene the conservation law.

By implementing a solution of the type defined by the equation of FIG. 18, the illumination values resulting from non-occluding surfaces are reduced generally, thereby mitigating the effect of undesirable artifacts, and avoiding difficulty in terms of obtaining a convergence of the radiosity equation.

Figure 19:
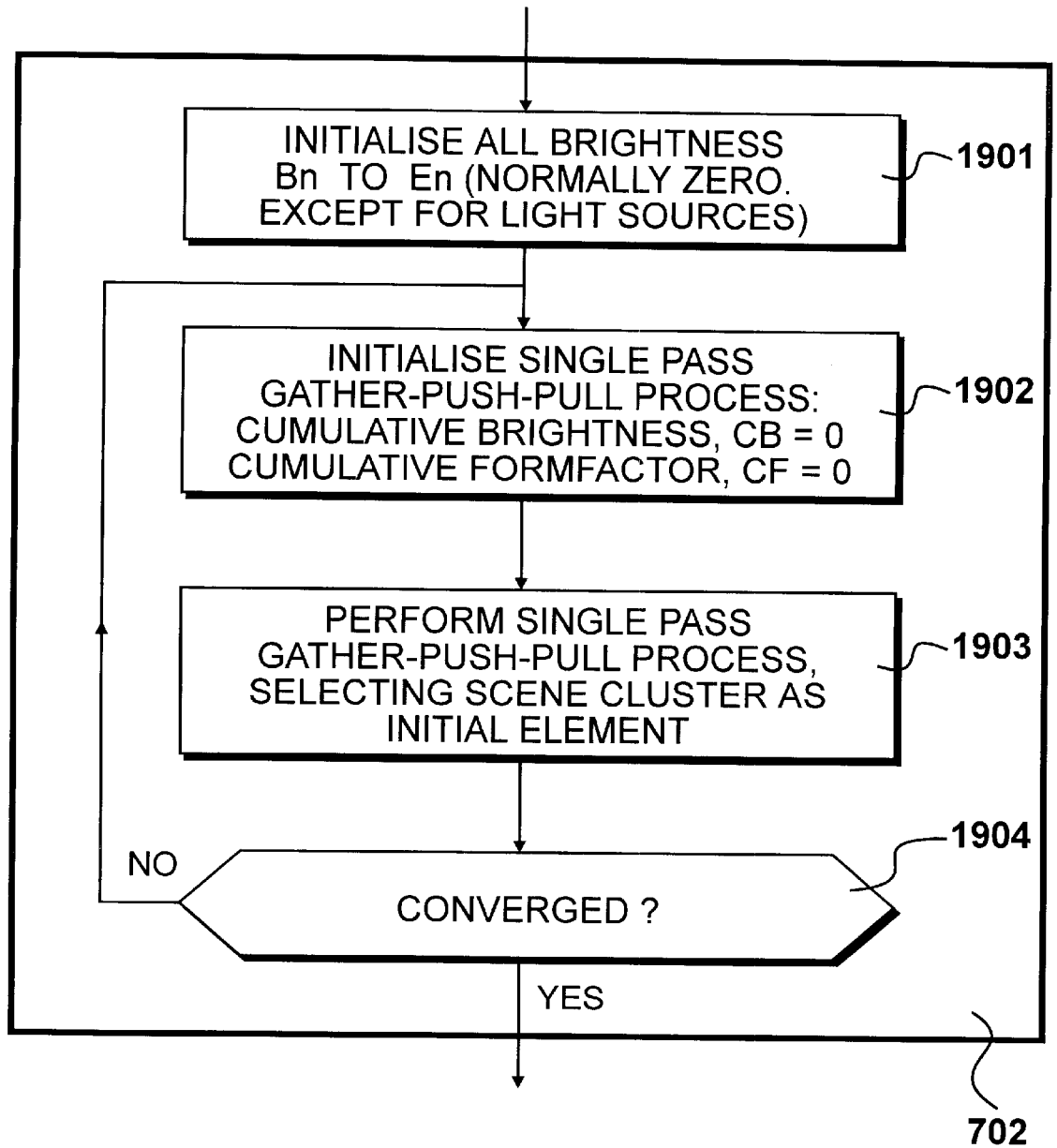
FIG. 19 details an improved process for solving the radiosity equation shown in FIG. 7, including a single pass gather-push-pull process.

An improved process for solving the radiosity equation as shown at step 702 in FIG. 7, is shown in FIG. 19. At step 1901, all element brightness values, Bn are initialised so as to be equal to their respective self-emission values, En. In most cases Bn will be set to zero, with the exception of elements that are self-emissive, such as light sources. At step 1902, an initialisation is performed with respect to values that are used subsequently at step 1903. These values are Cumulative Brightness, CB, and Cumulative Form Factor, CF. These are both set to zero.

At step 1903, a single pass gather-push-pull process is performed with respect to the scene cluster as the initial current element. Step 1903 combines the functionality of prior art solutions for gathering radiosity and push-pull radiosity, which are known to be performed separately, as is shown in FIG. 11, and detailed subsequently in FIGS. 12 and 13. In addition to combining this functionality into a single process, the combined process also includes a process of normalisation, such that the equation shown in FIG. 18 is implemented, and the problems identified in FIG. 14, FIG. 15 and FIG. 16 are solved. At step 1904 a question is asked as to whether the radiosity equation has converged, and if necessary, control is directed to step 1902 for an additional iteration.

Figure 20:
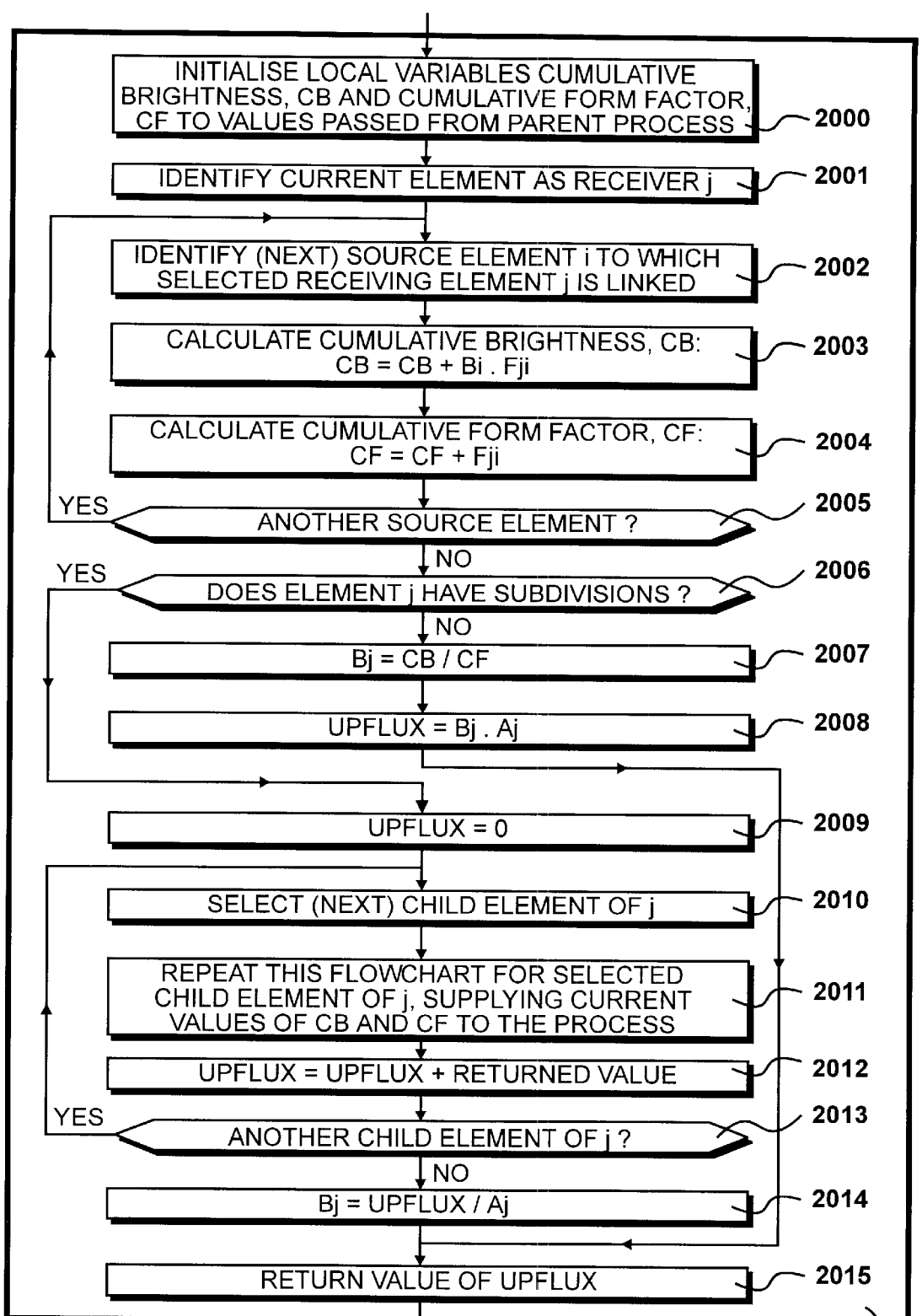
FIG. 20 details the single pass gather-push-pull process shown in FIG. 19.

The process 1903 of performing a combined single pass gather-push-pull process is detailed in FIG. 20. At step 2000 local variables for cumulative brightness, CB and cumulative form factor, CF are initialised to the values that were held in the corresponding variables in the parent process. Thus, on the first call of the process detailed in FIG. 20, CB and CF will both equal zero, as determined at step 1902 in FIG. 19. At step 2001 the currently selected element is denoted as receiving element j. In the initial case, the receiving element will be the scene cluster. At step 2002 a source element that is linked to j is denoted element i. At step 2003, the value for cumulative brightness, CB is increased by the product of the brightness Bj and the Form Factor Fij, the brightness being considered as light energy per unit time per unit area. At step 2004, the cumulative form factor, CF, is increased by the form factor Fij. At step 2005, a question is asked as to whether there are any other source elements to which the currently selected receiving element j is linked. If answered in the affirmative, control is directed back to step 2002. Alternatively control is directed to step 2006.

At step 2006 a question is asked as to whether the receiving element j has any subdivisions into other elements. In the initial case, this will be answered in the affirmative, because the initial receiving element will be the whole scene cluster, which has many subdivisions into other clusters, objects and mesh elements. If there are no subdivisions, control is directed to step 2007, where a calculation is made of the brightness Bj of the element, which is given by CB divided by CF. At step 2008, a further calculation is made of a variable UPFLUX, which is given by the product of Bj with its area Aj. UPFLUX has units of light energy per unit time. It is used to determine brightnesses of elements which have energy contributions from element subdivisions of different areas, and this is why the area factor is removed at this stage. After step 2008, the steps of the combined gather-push-pull process are complete.

If the question asked at step 2006 is answered in the positive, and there are further subdivisions of the currently selected receiving element j, control is directed to step 2009. At step 2009 the variable UPFLUX is initialised to zero. At step 2010, a child element of the current element is selected. At step 2011 the steps of the flowchart are called recursively, with the child element of current element j being considered as the new element j. In each recursive level, cumulative brightness and cumulative form factor values are considered as being local. Their values are initialised to those that are supplied from the parent process, as indicated at step 2000. At step 2012 the local value of UPFLUX returned from the recursive call at step 2011 is used in a calculation to determine the present value of UPFLUX. Here, the UPFLUX values are accumulated.

At step 2013, a question is asked as to whether there are any remaining child elements of j to be considered. If there are, control is directed back to step 2010. Alternatively, control is directed to step 2014, where a final calculation is made of the brightness Bj of the current element by dividing the accumulated UPFLUX value by the element area Aj. At step 2015, the present value of UPFLUX is returned as a parameter for use at higher levels of recursion in corresponding instantiations of step 2012.

At step 2004 the accumulation of form factors prepares the way for the lighting normalisation step at 2007. The visibility of elements with respect to each other is given by the respective form factor. Thus, the invention enables an accumulated level of light to be adjusted in response to the visibility of elements, including non-occluding elements.

Figure 21:
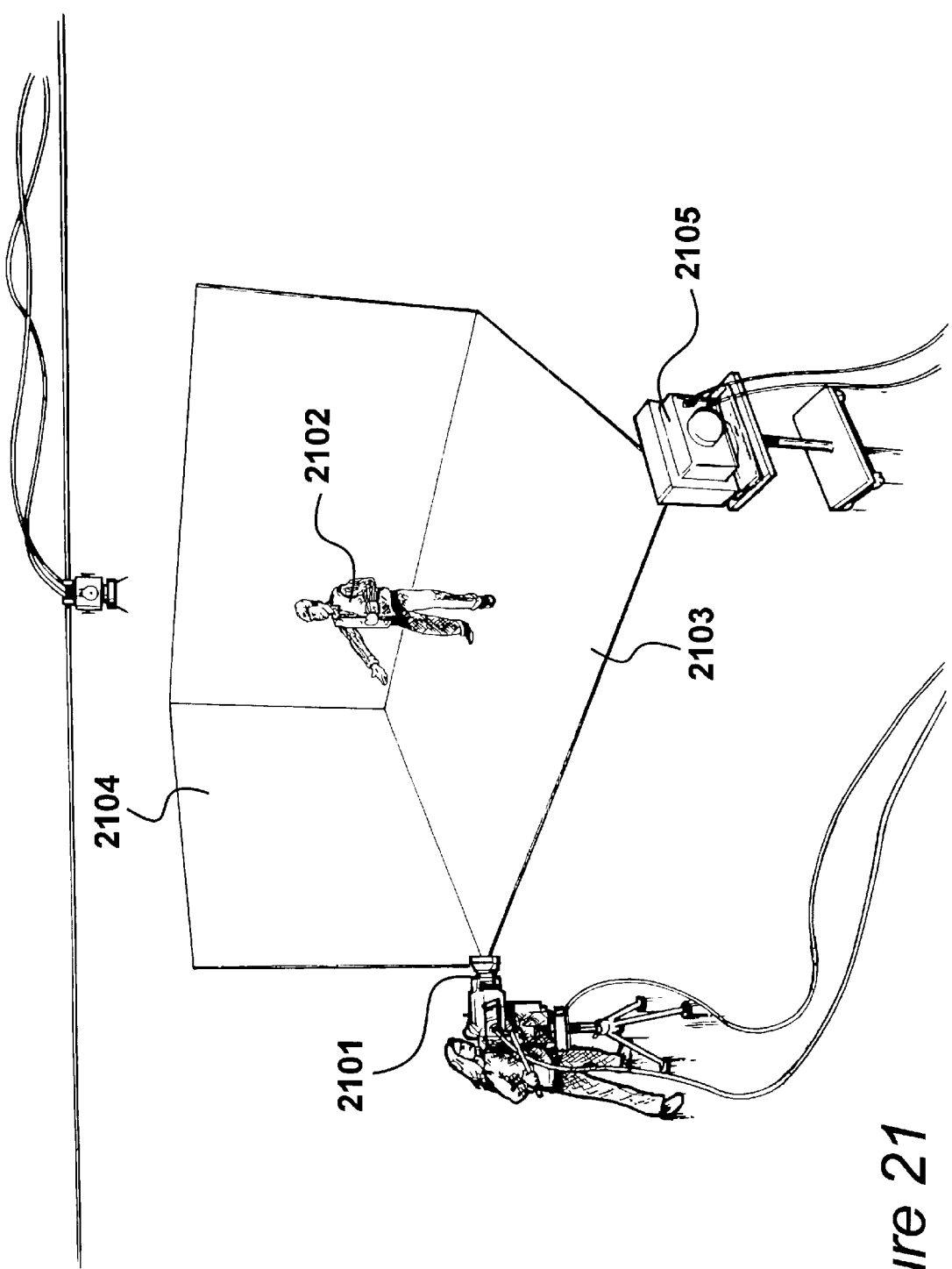
FIG. 21 shows a virtual set, for generating live video data.

The artificial scene shown in FIG. 4 may be combined with images from a real studio, such that artificial objects, walls and studio features may be superimposed upon a real studio in which minimal features are present. The combination of real and artificial images in this way results in the creation of a virtual set, in which real and virtual objects may be mixed. An example of a virtual set is shown in FIG. 21. A camera 2101 generates live video image data, as well as serial positioning data and lens data. The camera is aimed at talent 2101, located in the centre of a blue screen environment, comprising a blue screen floor 2103 and walls 2104. The blue colour of the walls is carefully controlled and calibrated in such a way as to facilitate automatic replacement of any blue areas of the subsequently processed camera images with a corresponding virtual image. A monitor 2105 facilitates visual feedback for the talent, such that it is possible to interact in a more natural way with objects in the virtual world.

Figure 22:
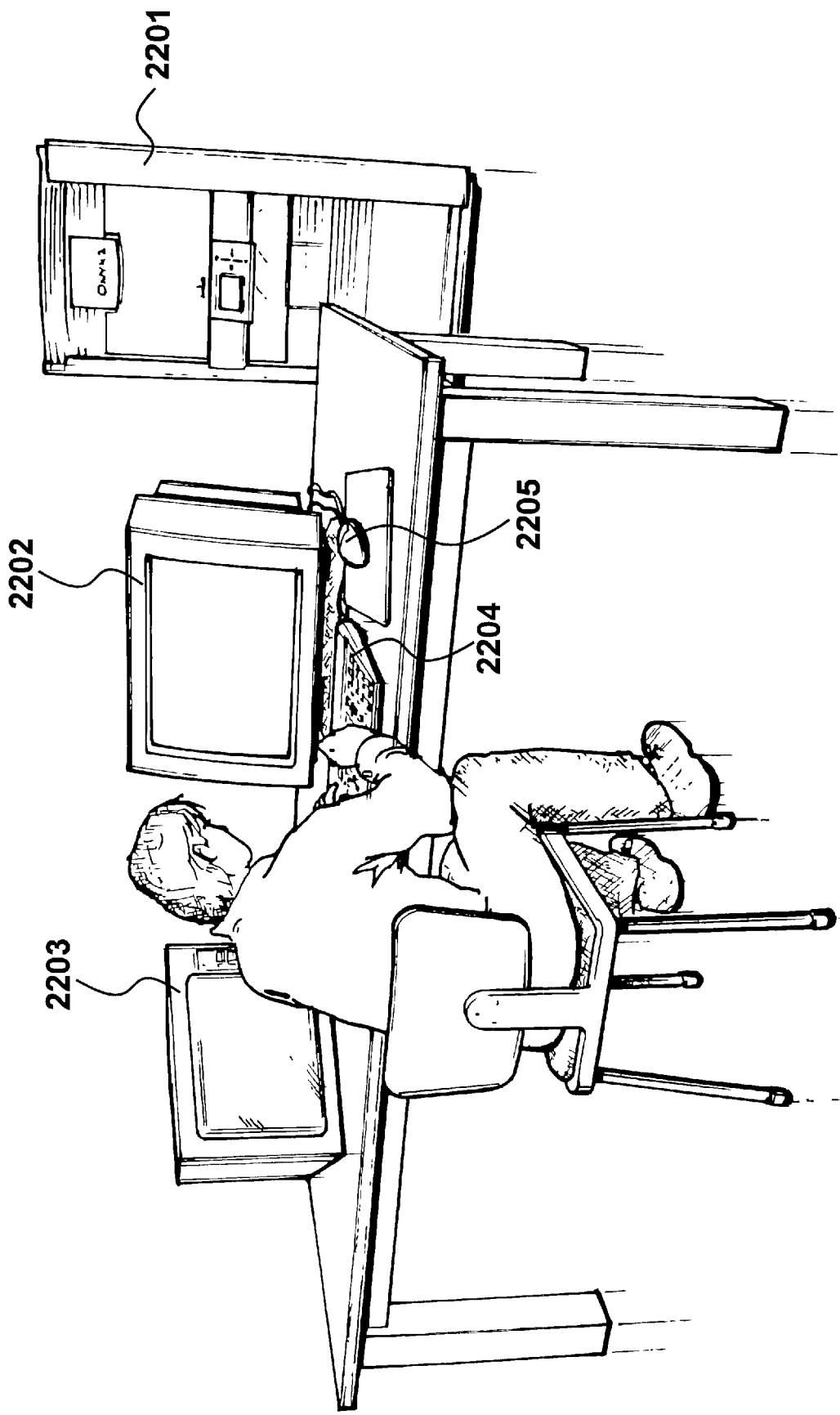
FIG. 22 details equipment for combining camera data with scene data in real time.

Equipment for compositing image data from the virtual set shown in FIG. 21 with artificial scene images such as the one shown in FIG. 4, is detailed in FIG. 22. A main processor 2201, such as an Onyx2™, manufactured by Silicon Graphics Inc, receives image and position data signals from the camera 2101 shown in FIG. 21. The position information from the camera, together with lens data, including zoom and focus, enable a calculation to be made of the viewpoint of the camera with respect to the virtual set. The walls of the virtual set are calibrated in position, so that at least one of either the floor or the two walls may be used as a reference plane that will match with a corresponding floor or wall plane in the artificial scene shown in FIG. 4. Commands for controlling the virtual environment are performed by the operator using a mouse 2205, a keyboard 2204 and a monitor 2202. A high quality broadcast monitor 2203 is also provided on which to view the results of the compositing process.

The operator has control over such parameters as blue screen removal, floor plane or wall plane tolerance mapping, quality control, ensuring that calibrations are maintained and so on. The main processor 2201 renders the scene shown in FIG. 4 in accordance with the radiosity simulation process described previously. Once this step has been performed, it then becomes possible to render the scene from any viewpoint. In a virtual set, the viewpoint is defined by the camera position and lens conditions. Thus, the main processor 2201 performs radiosity rendering in response to signals from the camera 2101. The rendered scene is then keyed with the real video data using a blue screen keyer process, such that the talent 2102 appears to be in a highly realistic scene, comprising the objects shown in FIG. 4. As is known, additional lighting effects may be added, in order to support view dependant lighting.

I claim:

1. A method of generating image data, wherein a plurality of elements are defined in three dimensional space; wherein selected elements are set as being non-occluding;

light emission values for said elements are determined by calculating the effect of light reflections between said elements; and an accumulated level of light is reduced in response to the visibility of elements including at least one of said non-occluding elements and in accordance with the formula $$B_j = E_j + R_j \cdot \left( \frac{\sum_{i=1}^{n} B_i \cdot F_{ji}}{\sum_{i=1}^{n} F_{ji}} \right)$$

wherein B represents a flux density of an element E, R represents a reflectance of the element E, and F represents a form factor.

2. A method according to claim 1, wherein said lighting calculations include a combined process of gathering radiosity and push-pull radiosity for a scene.

3. A method according to claim 1, wherein said plurality of elements defines a computer generated image for a virtual set.

4. A method according to claim 1, wherein results of said lighting calculations are rendered in response to data supplied from a virtual set.

5. Apparatus for generating image data, including storage means and processing means, wherein data stored in storage means defines a plurality of elements in three dimensional space, and instructions in storage means are arranged to configure said processing means to perform the steps of:

defining selected elements as being non-occluding; and calculating light emission values for said elements by simulating the effect of light reflections between said elements; wherein an accumulated level of light is reduced in response to the visibility of elements including at least one of said non-occluding elements and in accordance with the formula $$B_j = E_j + R_j \cdot \left( \frac{\sum_{i=1}^{n} B_i \cdot F_{ji}}{\sum_{i=1}^{n} F_{ji}} \right)$$

wherein B represents a flux density of an element E, R represents a reflectance of the element E, and F represents a form factor.

6. Apparatus according to claim 5, wherein said lighting calculations include a combined process of gathering radiosity and push-pull radiosity for a scene.

7. Apparatus according to claim 5, wherein said plurality of elements defines a computer generated image for a virtual set.

8. Apparatus according to claim 5, wherein results of said lighting calculations are rendered in response to data supplied from a virtual set.

9. In a virtual set, in which real foreground images are combined with synthesized background images in real time, means configured to generate said background image data, wherein a plurality of elements are defined in three-dimensional space;

selected elements are set as being non-occluding;

light emission values for said elements are determined by calculating the effect of light reflections between said elements; and an accumulated level of light is reduced in response to the visibility of elements including at least one of said non-occluding elements and in accordance with the formula $$B_j = E_j + R_j \cdot \left( \frac{\sum_{i=1}^{n} B_i \cdot F_{ji}}{\sum_{i=1}^{n} F_{ji}} \right)$$

wherein B represents a flux density of an element E, R represents a reflectance of the element E, and F represents a form factor.

10. A method according to claim 9, wherein said lighting calculations include a combined process of gathering radiosity and push-pull radiosity for a scene.

11. A computer-readable medium having computer-readable instructions executable by a computer such that said computer performs the steps of:

reading element data defined in three-dimensional space;

identifying selected occluding elements as being non-occluding;

calculating the effect of light reflections between said elements to determine light emission values for said elements; and reducing an accumulation of light levels in response to the visibility of elements including at least of one said non-occluding elements and in accordance with the formula $$B_j = E_j + R_j \cdot \left( \frac{\sum_{i=1}^{n} B_i \cdot F_{ji}}{\sum_{i=1}^{n} F_{ji}} \right)$$

wherein B represents a flux density of an element E, R represents a reflectance of the element E, and F represents a form factor.

12. A computer-readable medium according to claim 11, wherein said instructions are executed by said computer such that said lighting calculations include a combined process of gathering radiosity and push-pull radiosity for a scene.

* * * * *